Patented Oct. 10, 1950

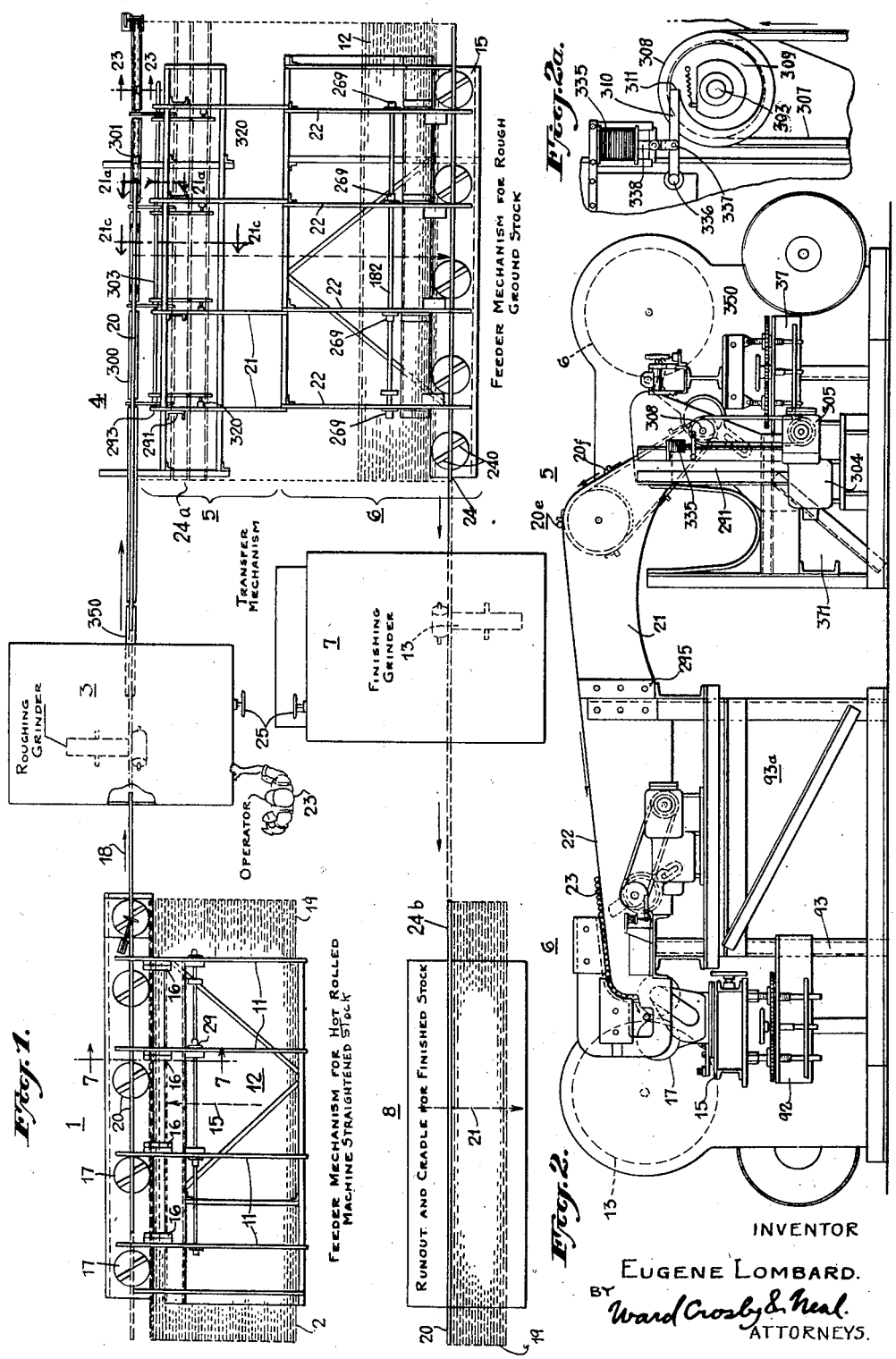

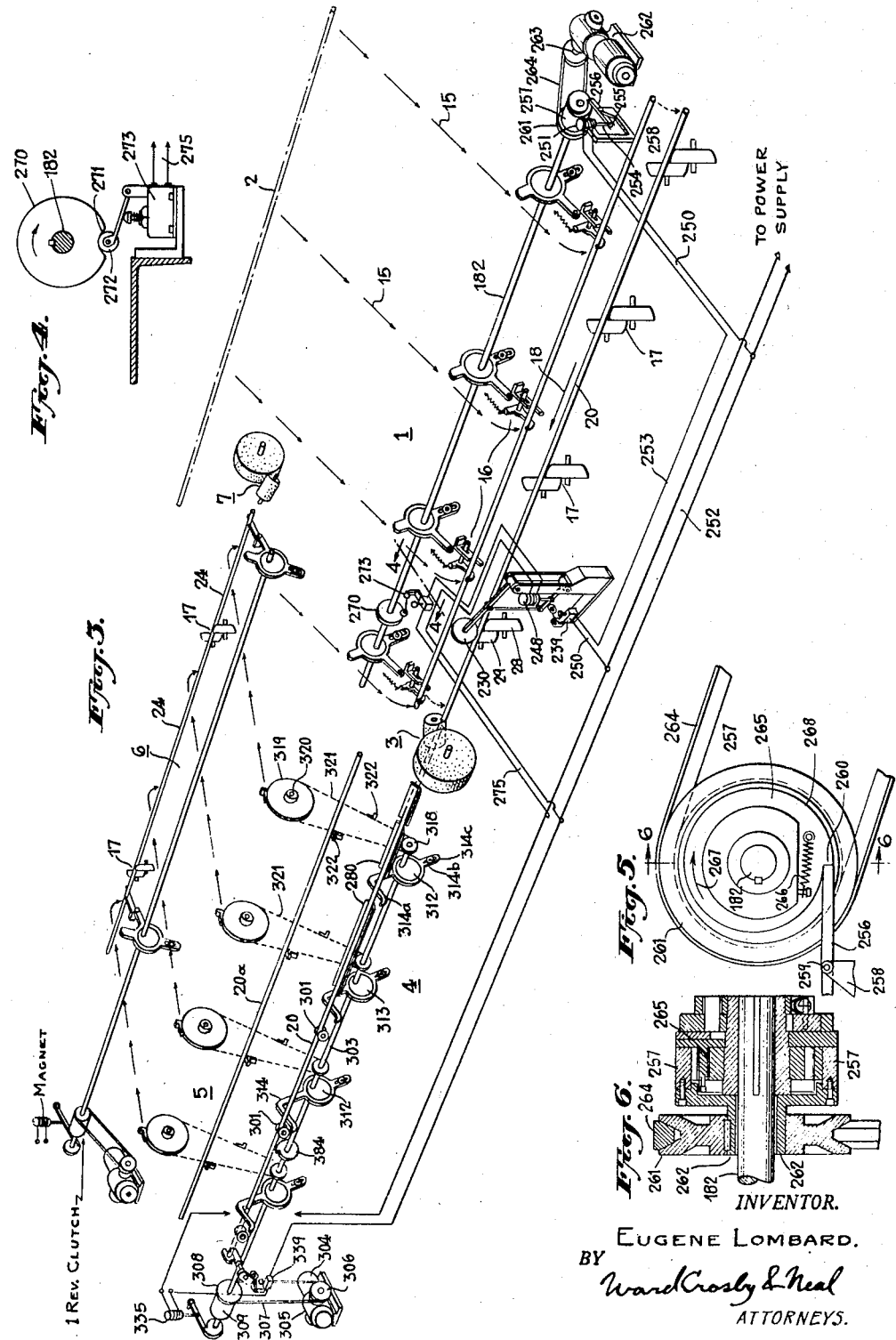

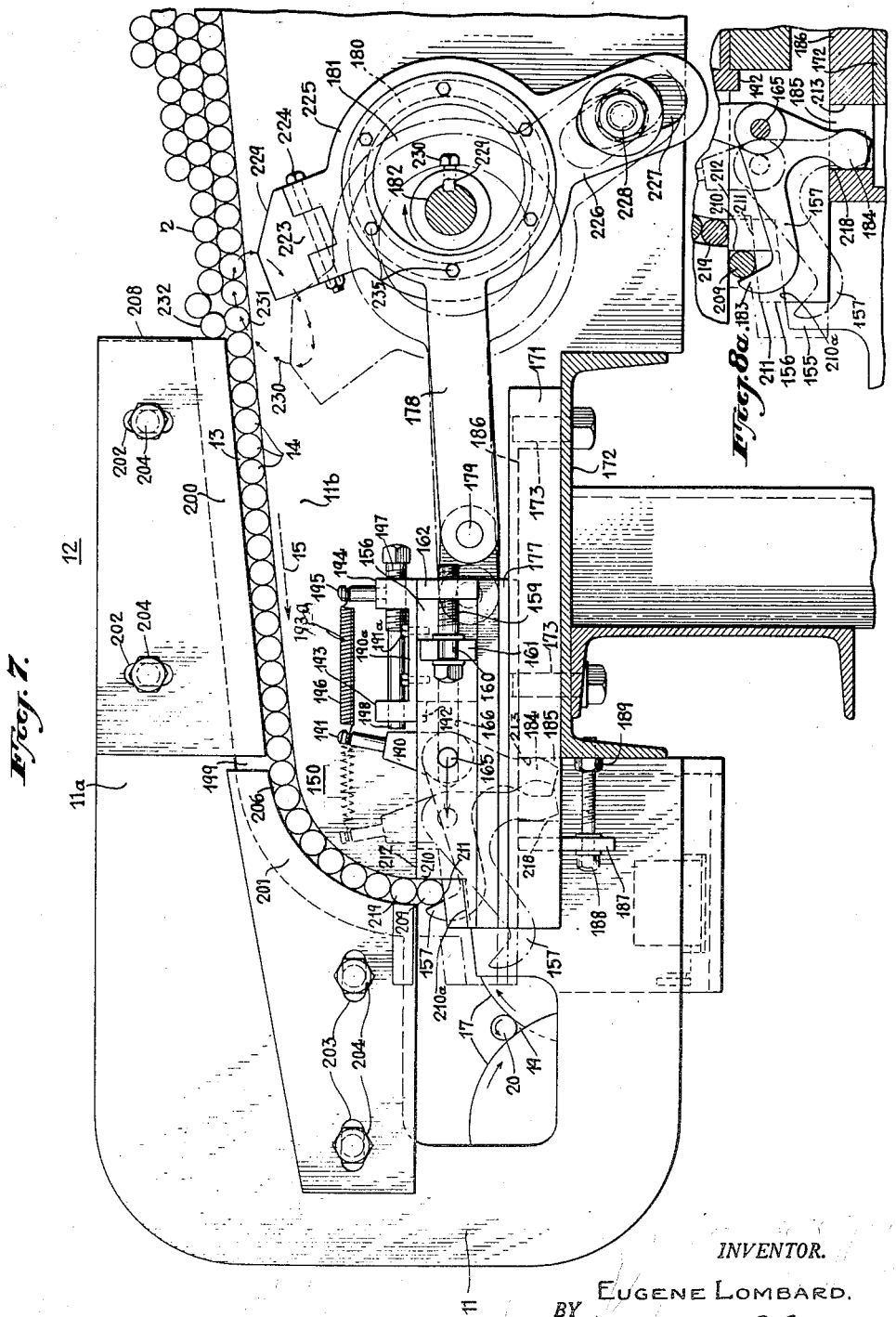

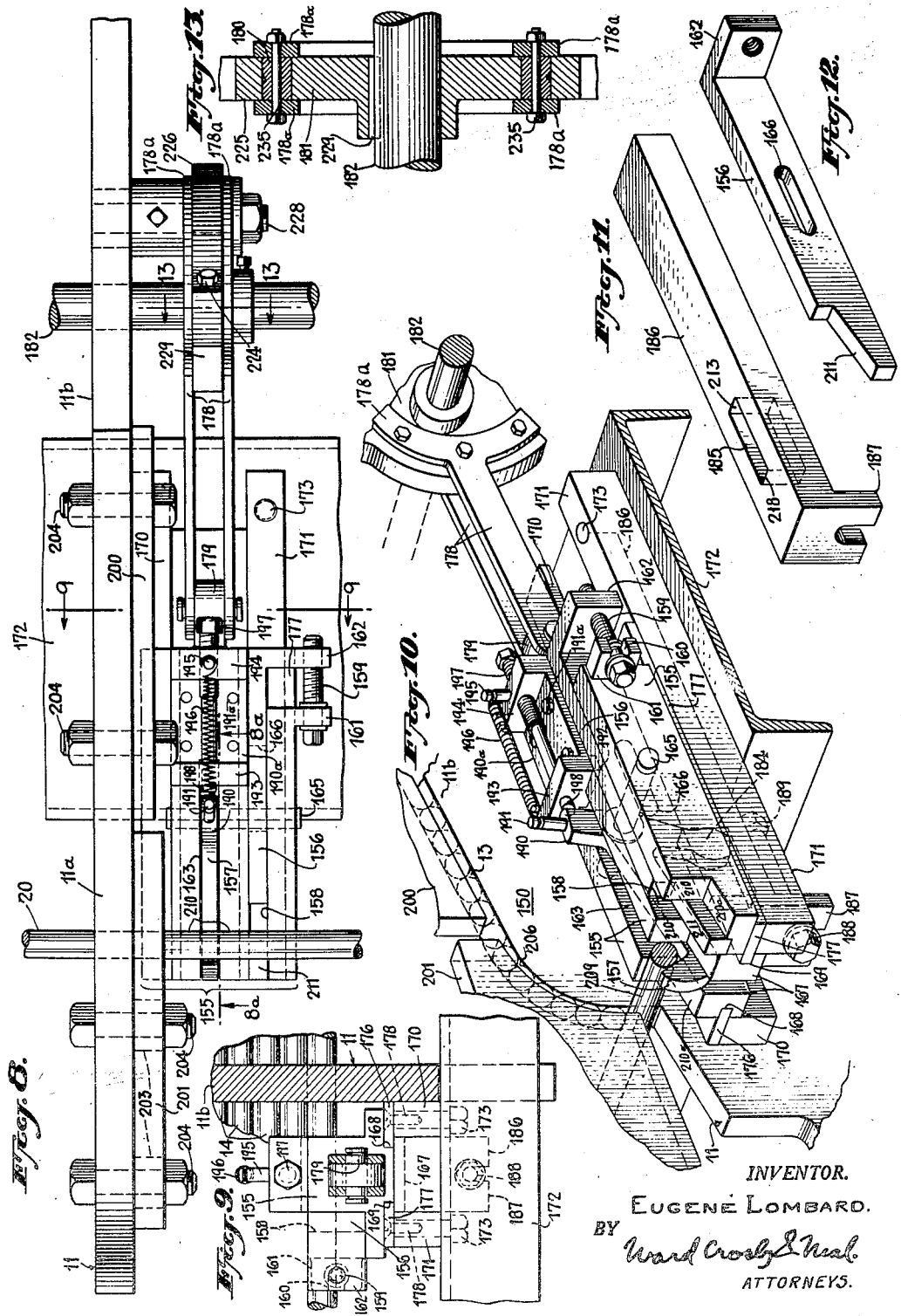

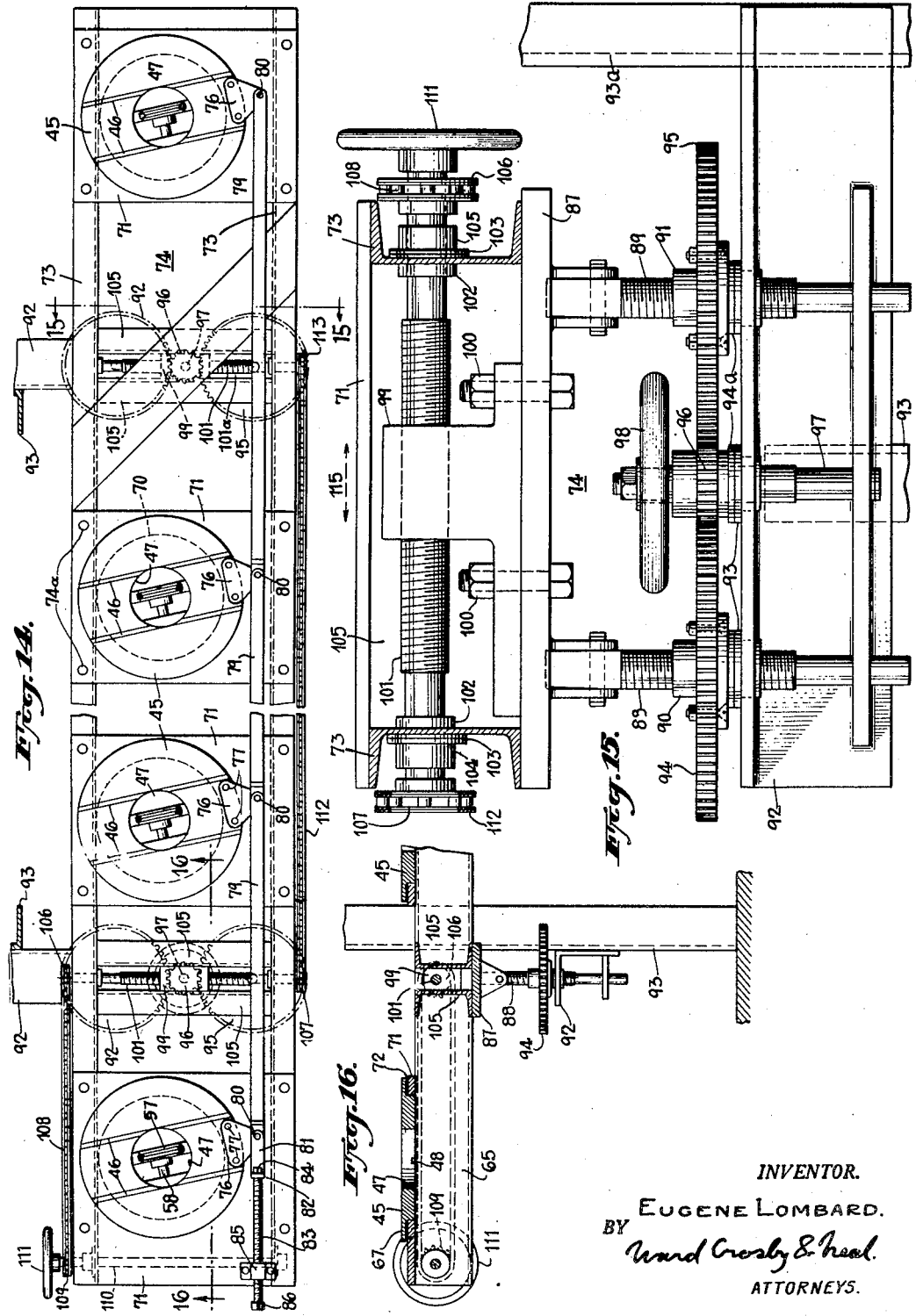

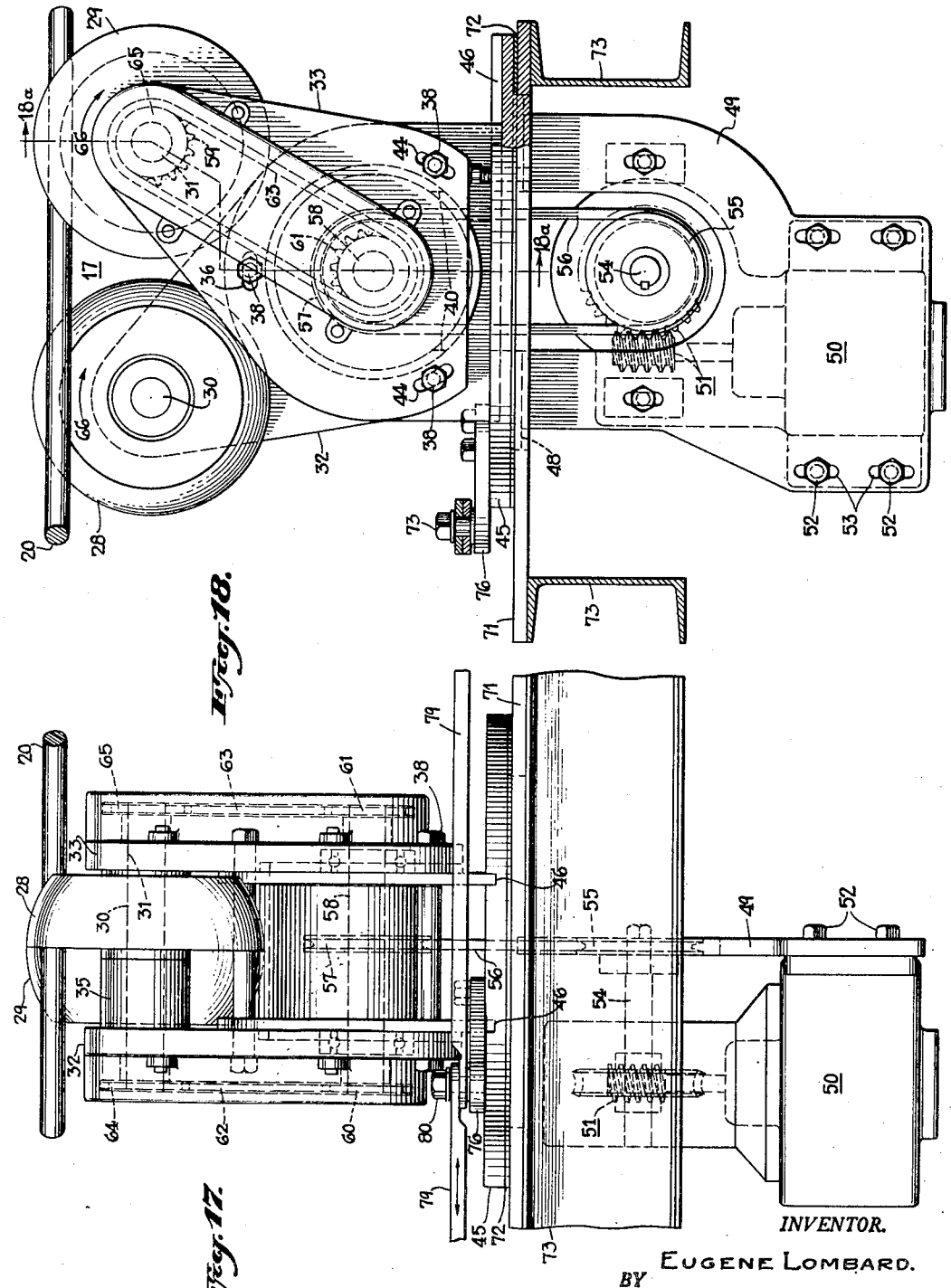

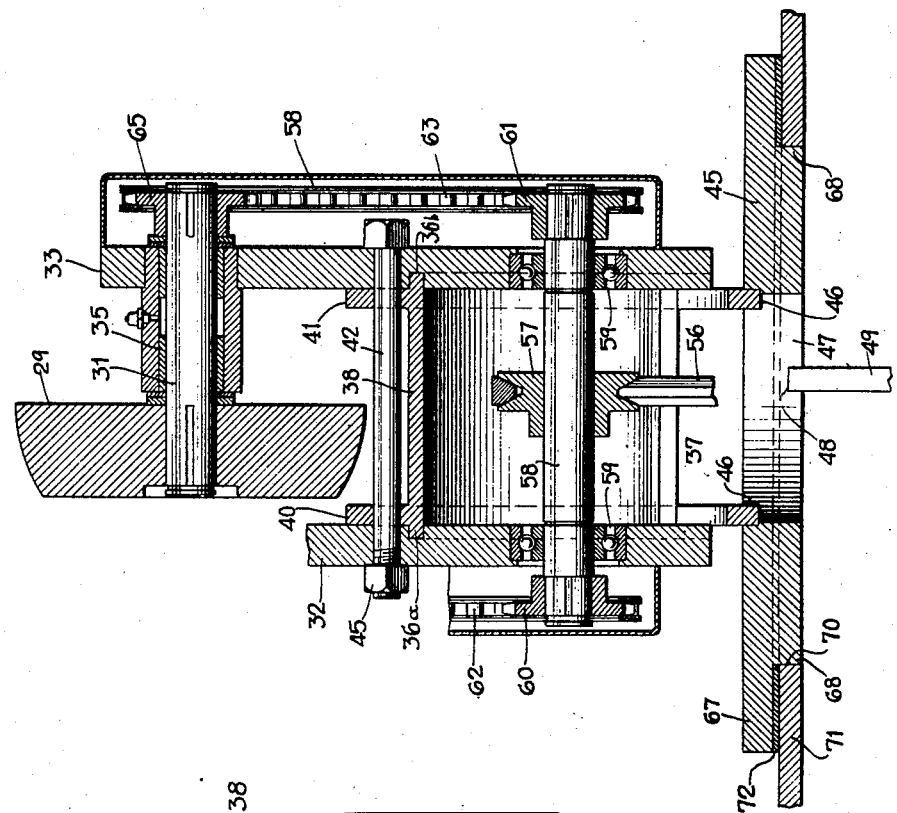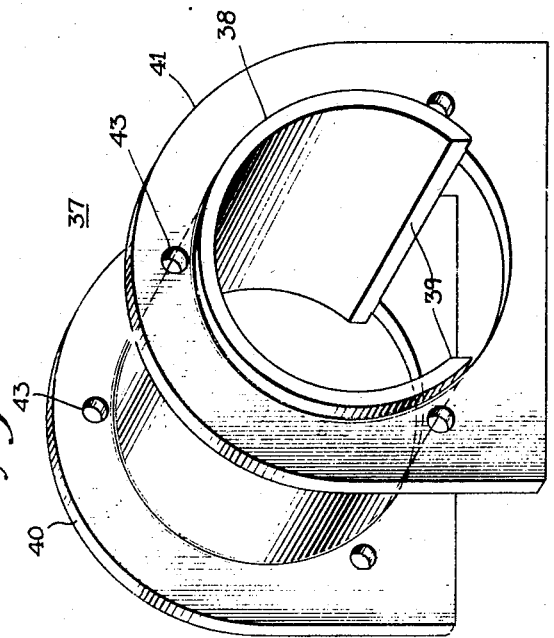

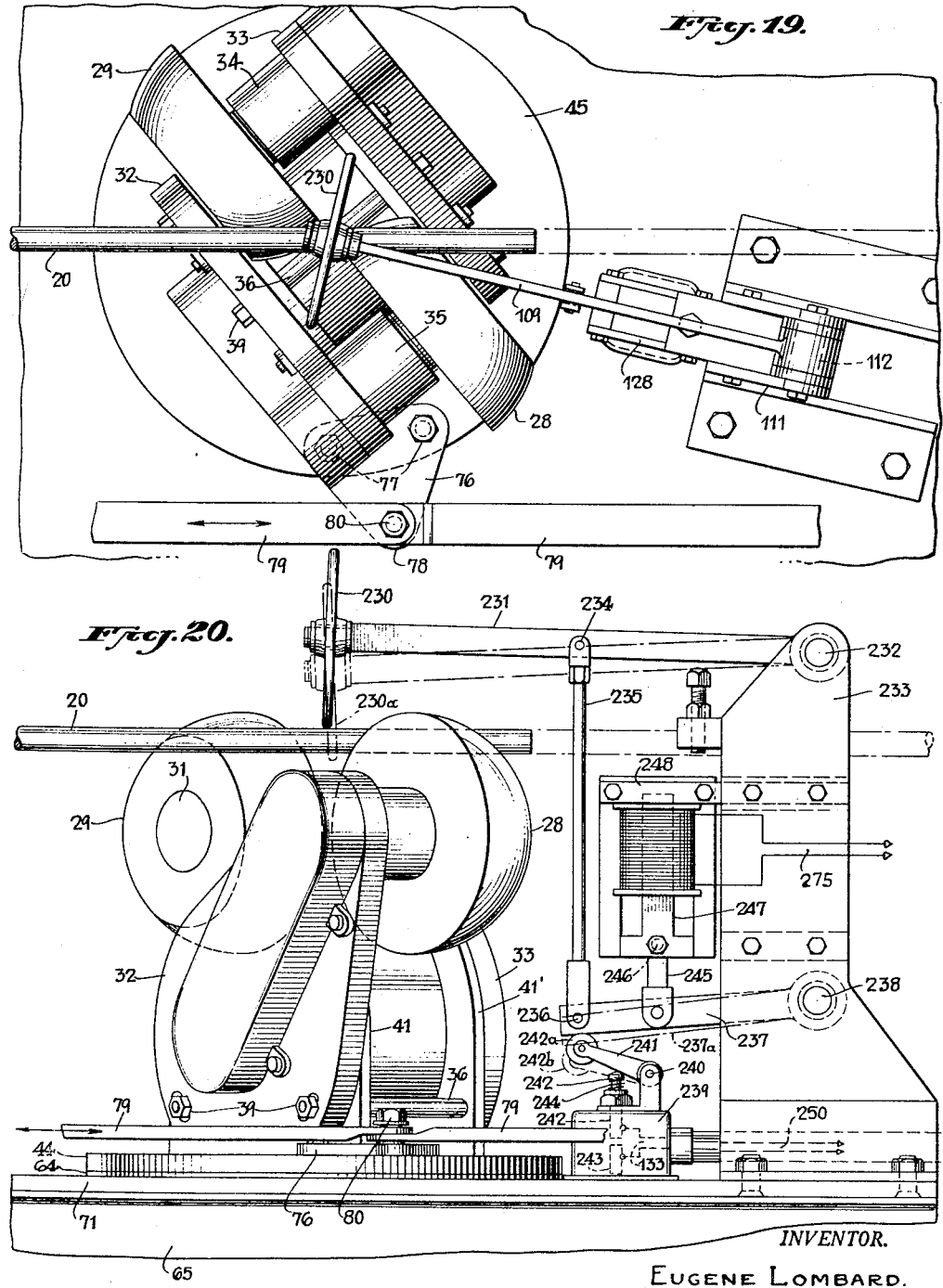

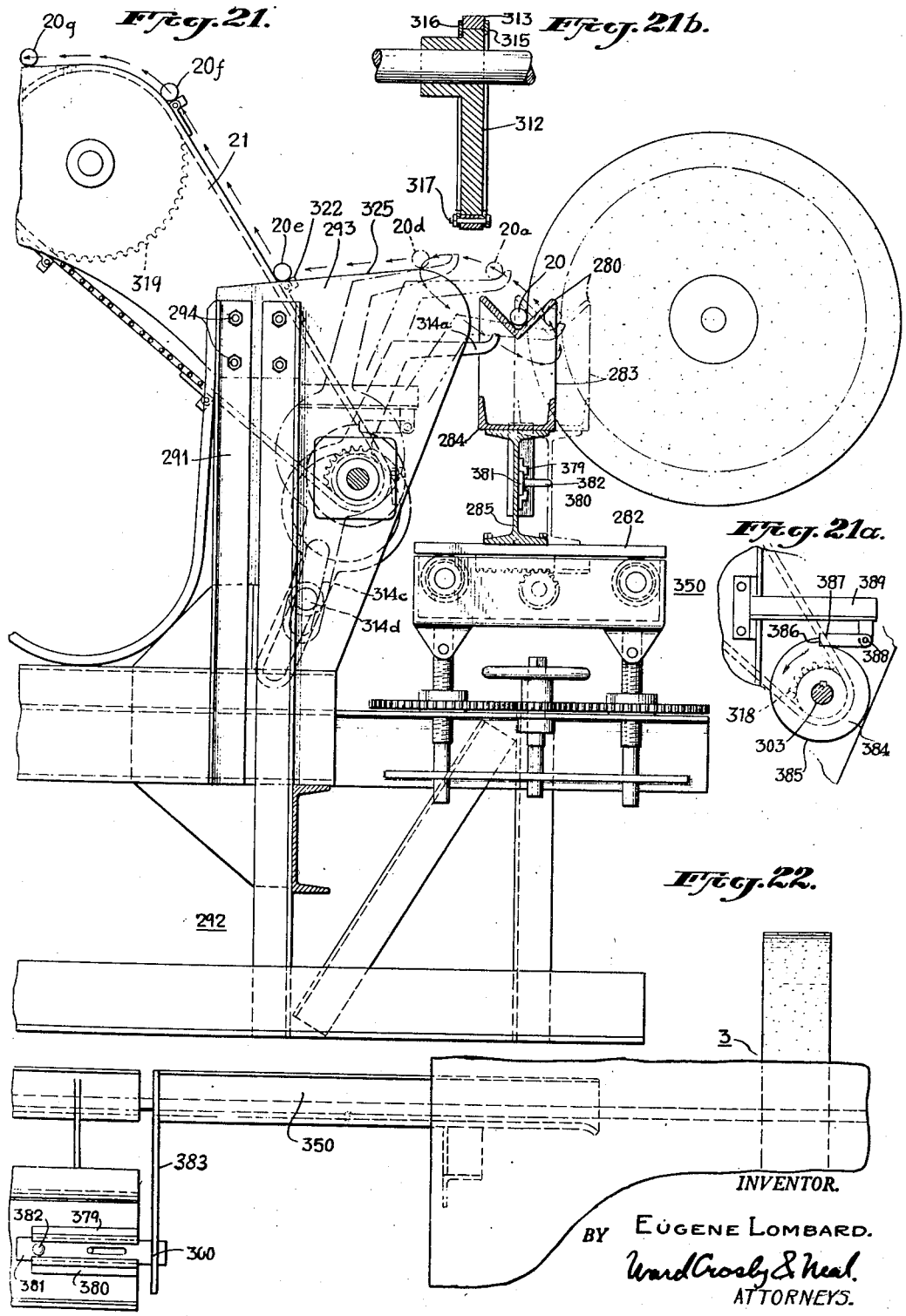

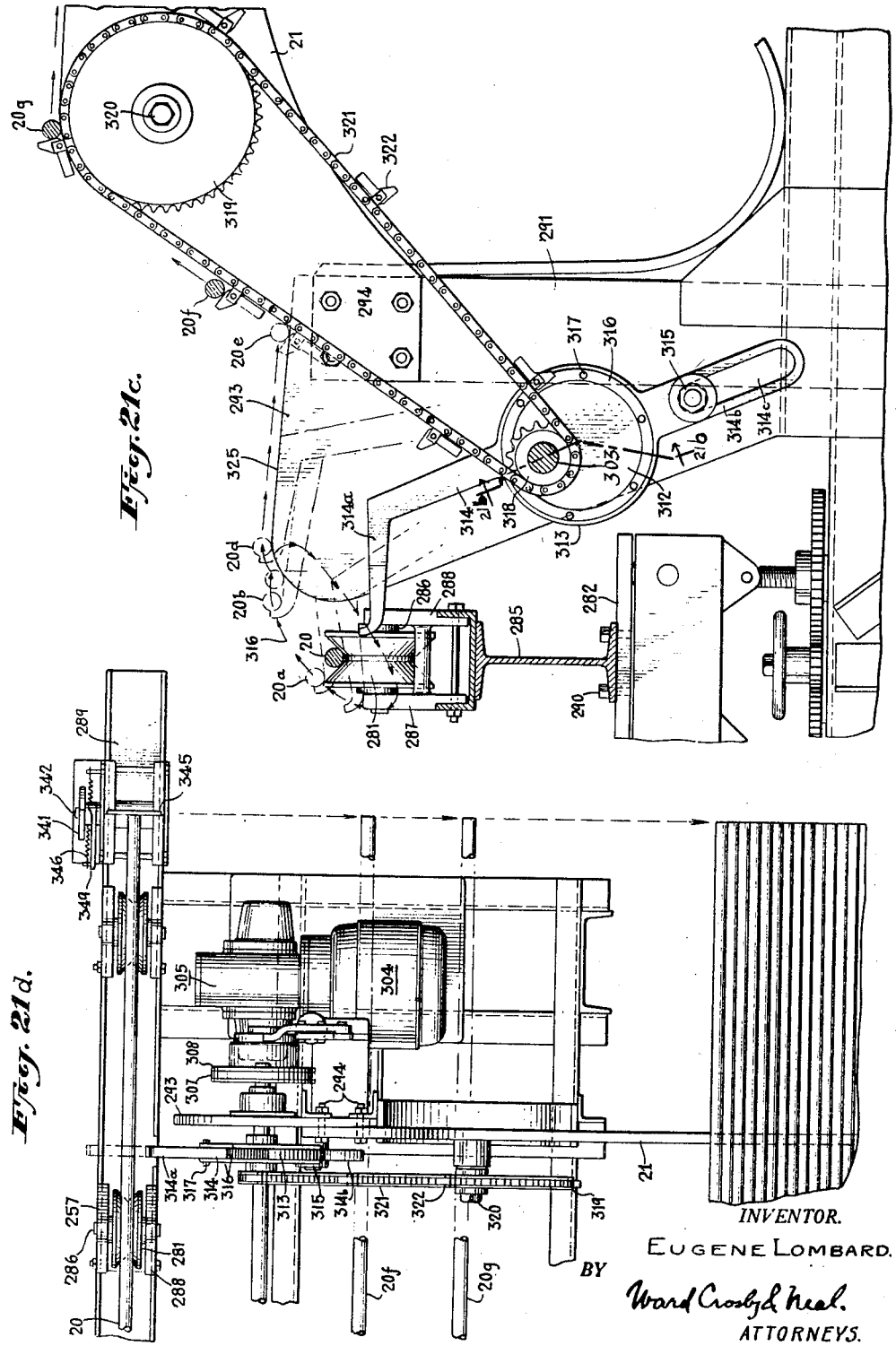

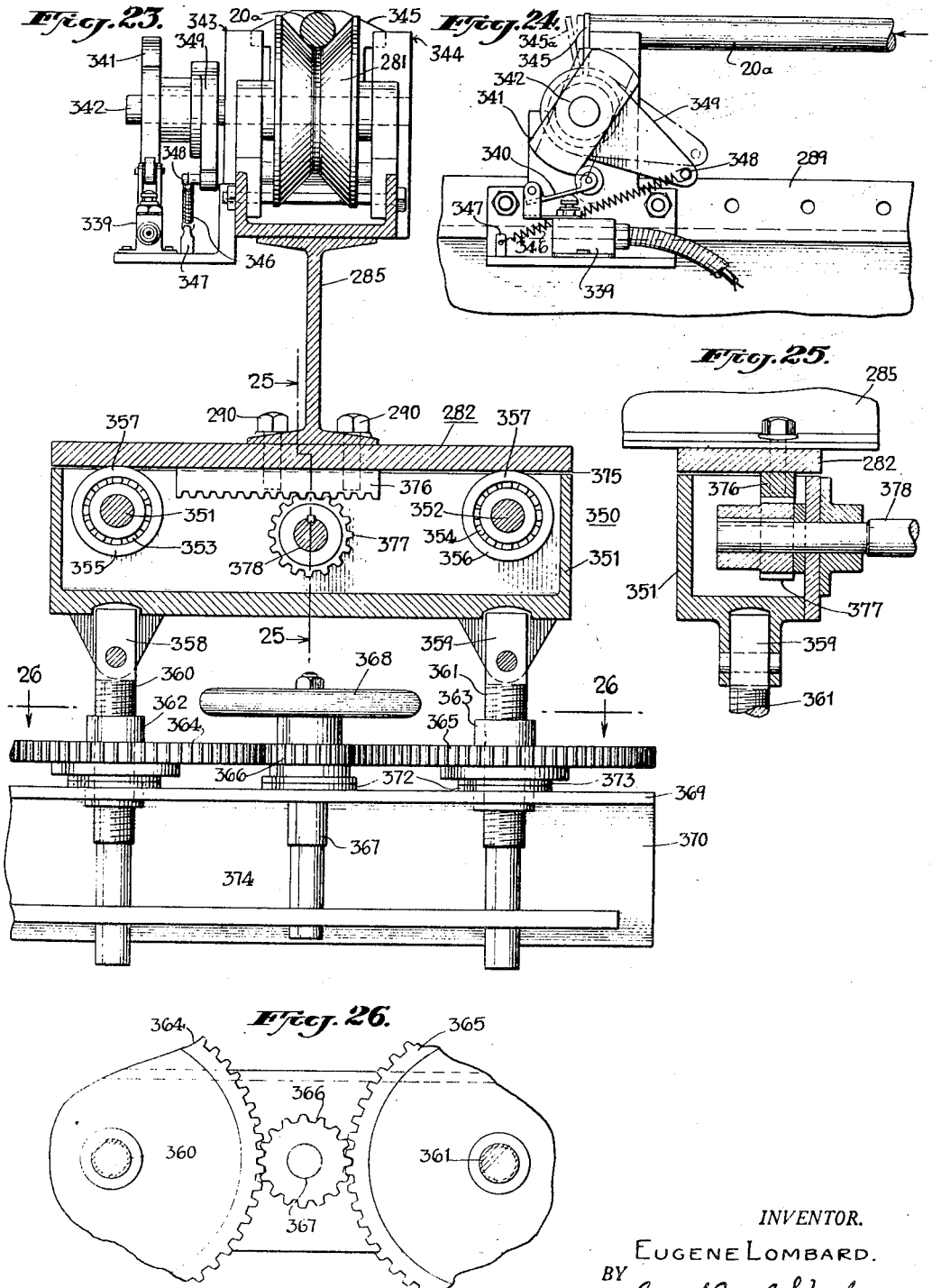

2,525,305

UNITED STATES PATENT OFFICE 2,525,305

APPARATUS FOR FEEDING ELONGATED STOCK TO AND FROM FABRICATING UNITS

Eugene Lombard, Clinton, Pa., assignor to Crucible Steel Company of America, New York, N. Y., a corporation of New Jersey Application August 4, 1949, Serial No. 108,616

14 Claims. (Cl. 51—215)

This invention pertains in one of its aspects to automatic feeder apparatus for automatically feeding lengths of straight, elongated cylindrical stock from a stacked supply thereof, successively and longitudinally, with rotary motion, into a fabricating unit. The invention pertains in another of its aspects to automatic transfer apparatus for automatically transferring stock lengths delivered from one fabricating unit onto automatic feeder apparatus in accordance with the first aspect of the invention, for automatically feeding said stock lengths longitudinally and successively, with rotary motion, through a second fabricating unit. The invention pertains in another of its aspects to the combination of at least two fabricating units for performing successive fabricating operations on lengths of elongated stock as aforesaid, together with automatic feeders in accordance with the first aspect of the invention for feeding said stock lengths into said fabricating units respectively, and a transfer apparatus in accordance with the second aspect of the invention for transferring stock lengths delivered from the first fabricating unit onto the automatic feeder supplying the second fabricating unit.

The apparatus in accordance with the invention is particularly applicable to the automatic feeding of straightened and round metal bar stock into centerless grinders, processing machines that require round, machine straightened elongated stock, and the like, and to the automatic delivery and transfer therefrom of such bar stock onto an automatic feeder unit in accordance with the invention for feeding the stock into a second centerless grinder, or the like as aforesaid, whereby but one attendant is required for supervising the operations of the entire apparatus.

This latter aspect of the invention may be extended to any number of fabricating units arranged in tandem for performing a like number of successive fabricating operations upon lengths of elongated stock, by providing each fabricating unit on its entrance side with an automatic feeder unit in accordance with the invention, and providing each such fabricating unit, except the last of the tandem series, with an automatic transfer unit in accordance with the invention for transferring the stock lengths delivered from one fabricating unit in the tandem series onto the automatic feeder unit of the next fabricating unit in the tandem series.

In consequence of this arrangement, only one or a relatively few attendants may effectively supervise the successive fabricating operations of many fabricating units, in marked contrast to the practices heretofore in vogue according to which an attendant has been required for each fabricating unit, manually to feed the stock lengths thereinto, while additional attendants have been required for manually transferring the stock lengths delivered from one fabricating unit to the attendant manually feeding stock lengths into the second fabricating unit. The invention thus provides labor saving devices of first magnitude, by greatly reducing the man power required, and by relieving those retained of tedious, repetitive manual operations, and elevating their duties to those of a supervisory nature comprising the checking of performances of the various machines or units in automatically effecting their prearranged sequence of operations, and in checking the results of these operations on the fabricated stock from time to time, the latter as to tolerance limits, quality, etc.

The automatic feeder and transfer mechanisms in accordance with the invention are not restricted as to the lengths of elongated stock that they are capable of handling, and in fact will handle, without necessity for adjustments on the feeder mechanism, successive stock sections of the same cross-sectional area, which vary in length from section to section, and which may range in length anywhere from a few feet up to forty feet or more, for any given mechanisms in accordance with the invention designed for most commercial operations. In this connection, however, it is pointed out that smaller units in accordance with the invention may be constructed to handle smaller diameter and shorter stock lengths, and likewise that larger units may be constructed to handle larger diameter and longer stock lengths. The only adjustment required in the apparatus of the invention for handling different types of stock, is that resulting from changes in the sectional dimensions of the stock, and to compensate for variations of this character, a simple adjustment of the automatic feeder mechanism is required.

Heretofore no apparatus has been devised, insofar as I am aware for automatically feeding bar stock in long lengths, of the order of two to forty feet or more into centerless grinders, or other processing machines that require round, machine straightened elongated stock, or the like, with the exception of the devices disclosed in copending applications of C. J. Murray and W. K. Lowe Serial Nos. 769,114 which matured as Patent No. 2,503,761 on April 11, 1950, and 721,930 which matured as Patent No. 2,503,760 on April 11, 1950, owned by the assignee of the instant application. In the automatic feeder mechanisms of said Murray-Lowe applications, the bar stock is fed by gravity down an inclined table, and thence into a grooved guide aligned with the work path of the fabricating unit, from whence the stock lengths are fed successively into the fabricating unit by operation thereon of a reciprocating plunger. This plunger type automatic feed requires adjustment of the plunger stroke for each different length of bar stock to be fed, and for this same reason is not adapted to the automatic feeding of bar stock in random lengths, i. e., which vary in length from bar to bar.

The automatic feeder apparatus of the present invention differs fundamentally from that of said Murray-Lowe applications in that it is of a continuous feed construction, employing no reciprocatory plunger for feeding the stock, but to the contrary employs a series of continuously driven feed rolls onto which the stock lengths are delivered successively from a supply magazine, by means of a reciprocatory transfer or ejector mechanism, which automatically transfers successive stock lengths from the supply magazine onto the feed rolls.

The automatic feeder apparatus in accordance with the invention comprises, more specifically, an aligned series of driven feed rolls for feeding and guiding the stock lengths successively and longitudinally into the fabricating unit, a magazine sloping downwardly toward the feed rolls for containing a supply of the stock lengths, and for feeding the same under gravity toward the feed rolls, an ejector mechanism reciprocable to transfer the stock lengths successively from the magazine onto the feed rolls. In addition the apparatus includes a driven shaft eccentrically linked to the ejector mechanism, for reciprocating the same, once for each revolution of the shaft, a single revolution type of clutch, actuatable to couple the driving shaft to a continuously rotating, driving sheave. The apparatus further includes a switch having a weighted, vertically displaceable switch arm adapted to ride upon the upper surface of each stock length during its propulsion along the feed rolls, and to drop down under gravity to actuate the switch upon transit of a stock length beyond the switch arm. Actuation of this switch in turn energizes a solenoid, which in turn actuates the clutch aforesaid to drivingly couple the driven shaft to the driving sheave for a single revolution thereof, each time the clutch is thus energized. This clutch accordingly reciprocates the ejector mechanism for one complete forward and backward stroke thereof, to deliver the next stock length onto the feed rolls. Mounted on the driven shaft is a cam containing a single recess in which normally rests a switch arm of a second switch, so that this second switch is not actuated while the driven shaft is at rest, but is actuated as soon as the shaft starts to rotate to disengage this second switch arm from the cam recess, this switch thus remaining actuated until the driven shaft has completed a revolution and returned the second switch arm into the cam recess. Actuation of the second switch in the manner described in turn energizes a solenoid which elevates the weighted switch arm above the level of the next succeeding stock length delivered onto the feed rolls and is being propelled into the fabricating mechanism, whereby, upon release of the solenoid controlling the weighted switch arm, the latter drops down and rides upon the upper surface of the next succeeding stock length. This status continues until said next succeeding stock length has been propelled into the fabricating unit past the weighted switch arm, whereupon the latter again drops down under gravity to actuate the switch first mentioned, and thus again reenergize the clutch for causing the driven shaft to be rotated again for a complete revolution to deliver the next bar length onto the feed rolls in the manner above described. In this way the stock lengths are automatically fed into the fabricating unit as rapidly as said unit can handle the stock, inasmuch as each stock length in passing into the fabricating unit actuates the weighted switch arm as soon as the fabricating unit is ready to handle the next succeeding stock length. The feeder apparatus thus performs automatically, with a minimum loss of time and delay, in feeding successive lengths of stock into the fabricating unit with ends abutting.

The transfer apparatus in accordance with the invention for receiving elongated stock lengths delivered thereto from a fabricating unit, and for automatically transferring the same to a feeder unit of a next succeeding fabricating unit, comprises in its essentials: A runout trough for receiving said stock lengths, a driven shaft paralleling said trough, elevating means including sprockets secured to said shaft and chains extending therefrom to other sprockets mounted above said trough, stock engaging fingers spaced along and secured to said chains, and finger members eccentrically linked to said shaft and having slotted lower portions pin-connected to fixed supports, and having substantially horizontally extending upper arms adapted to engage and lift the stock lengths from said runout trough upon rotation of said shaft, and to deliver the same onto a skid plate which delivers by gravity to the finger members secured to the chains, whereby the chains elevate the stock lengths and deliver them onto the feeder unit of the next succeeding fabricating unit. For actuating the driven shaft in question, at the appropriate intervals for elevating each stock length delivered onto the runout trough, a single revolution type of clutch is provided which releasably couples the driven shaft to a continuously rotating driving sheave. A suitable clutch of this type is the Hilliard single revolution clutch, type 6, specifically the No. 4 modification employing a simple trip lever, as described for example, in Bulletin No. 239 of the Hilliard Corporation, Elmira, New York. This clutch is normally released, but is automatically operated to rotate the driven shaft one revolution, each time a stock length is delivered onto the runout trough. This automatic operation is affected by means of a trigger mechanism resiliently mounted at the far end of the runout trough from that of the fabricating unit, which trigger mechanism is actuated by abutment of each stock length thereagainst, as the stock length reaches the end of the runout trough. This trigger mechanism in turn actuates a switch which energizes a solenoid, in turn to actuate the trip lever of the clutch mechanism, thus to rotate the driven shaft. As soon as the stock length in question is elevated from the runout trough in the manner aforesaid by rotation of the driven shaft, the trigger mechanism is restored, thus opening the switch and deenergizing the solenoid, whereby the trip lever engages the clutch stop upon completion of one revolution, thereby to release the clutch from the driven shaft.

Aside from the basic features of the invention above referred to, the components of the apparatus involve a number of additional novel features of construction and operation which will become apparent as the description proceeds.

Having thus described the invention in general terms, reference will now be had, for a more detailed description thereof, to the accompanying drawing wherein:

Figure 1 is a top plan view of apparatus in accordance with the invention, comprising the feeder mechanism for feeding hot rolled, machine straightened bar stock into a roughing grinder and thence successively onto run-out and transfer mechanisms for transferring the rough ground stock to a finishing grinder, and thence onto a run-out cradle for the finished stock.

Fig. 2 is a view in end elevation of the Fig. 1 assembly as viewed from the right in Fig. 1. Fig. 2a is an enlarged end elevation of a single revolution type of clutch and actuating solenoid mechanism controlling transfer of the bar stock from the run-out to the transfer mechanism.

Fig. 3 is a schematic perspective view of the Fig. 1 assembly, illustrating the essential operating details and mechanisms of the feeder, run-out and transfer units. Fig. 4 is an enlarged detail in sectional elevation, taken at 4—4 of Fig. 3, of a cam-actuated microswitch employed in the feeder mechanism. Fig. 5 is an end elevation, and Fig. 6 an axial section, taken at 6—6 of Fig. 5, of one of the single revolution, Hilliard clutch mechanisms employed in the Figs. 1 to 3 assembly.

Fig. 7 is an enlarged sectional elevation of the cam-actuated feeder mechanism, as taken at 7—7 of Fig. 1. Fig. 8 is a top plan view of the assembly shown in Fig. 7. Fig. 8a is an enlarged sectional detail, taken at 8a—8a of Fig. 8, illustrating the bar release finger of the cam-actuated feeder mechanism, in the advanced position. Fig. 9 is a sectional elevation of the Figs. 7 and 8 assembly, as taken at 9—9 of Fig. 8. Fig. 10 is a view in perspective of the cam-actuated feeder mechanism shown in the Figs. 7 and 8 assemblies. Figs. 11 and 12 are perspective views of components of the Fig. 10 assembly. Fig. 13 is a detail in axial, sectional elevation of the eccentric mechanism of the Fig. 8 assembly, as taken on line 13—13 of Fig. 8.

Fig. 14 is a top plan view of the bar stock feeder table with the canted pairs of driven, bar stock feeder rolls, removed for exposing to view the lateral table shifting and elevating mechanisms. Fig. 15 is a sectional elevation as taken at 15—15 of Fig. 14, for further illustrating the details of the table shifting and elevating mechanisms. Fig. 16 is a sectional elevation, as taken at 16—16 of Fig. 14, for illustrating further details of the table elevating mechanism.

Figs. 17 to 20 inc., illustrate one set of the canted pairs of driven bar stock feed rolls together with the drive mechanisms therefor, for feeding the bar stock longitudinally, with rotary motion, into the grinder, these feeder rolls being mounted on the feeder table illustrated in Fig. 14. In these views Fig. 17 is an end elevation of the feed roll pair as taken at right angles to the axes thereof. Fig. 18 is a front elevation of the feed roll pair including the drive. Fig. 18a is a cross sectional view taken at 18a—18a of Fig. 18, illustrating further details of the feed roll drive. Fig. 18b is a perspective detail view of a cylindrical bearing and bearing roll supporting member employed in the Figs. 17 to 18a assembly. Fig. 19 is a top plan view of one of the feed roll pairs, this view also illustrating the trip wheel actuated microswitch for actuating one of the clutch mechanisms of the feeder as described hereinafter. Fig. 20 is a side elevation of the Fig. 19 assembly.

Fig. 21 is an enlarged view in end elevation of the run-out table and a portion of the transfer mechanism assembly illustrated in Fig. 2. Fig. 21a is a sectional elevation at 21a—21a of Fig. 1 showing a stop cam arrangement for the bar stock elevating mechanism. Fig. 21b is a sectional detail taken at 21b—21b of Fig. 21c. Fig. 21c is a sectional elevation as taken at 21c—21c of Fig. 1; while Fig. 21d is a plan view of the parts illustrated in Fig. 21c.

Fig. 22 is a fragmentary view in side elevation of the long bar fixture connection between the run-out table and the grinder.

Fig. 23 is an enlarged cross sectional elevation of an end portion of the run-out table and elevating mechanism therefor taken as 23—23 of Fig. 1, this view also illustrating the trip mechanism for operating the microswitch at the end of the run-out table. Fig. 24 is a view in side elevation of the trip mechanism and microswitch of Fig. 23. Fig. 25 is a fragmentary detail in sectional elevation as taken at 25—25 of Fig. 23. Fig. 26 is a plan view of the drive pinions for the elevating mechanism of Fig. 23, taken along the line 26—26 of Fig. 23.

Referring to Figs. 1, 2, 3, and 7, the general layout and overall operation of apparatus in accordance with the invention, as employed by way of illustrative example only, in conjunction with centerless grinders, is as follows. In Figs. 1 and 3, there is shown a feeder mechanism 1 which automatically feeds hot-rolled and machine-straightened bars 2 into and through a roughing centerless grinder 3, and thence onto a run-out 4, from whence the bars are picked up by a transfer mechanism 5 and delivered onto a feeder mechanism 6 identical with 1. Feeder 6 feeds the bars into and through a finishing grinder 7, from whence they are fed onto a run-out and cradle 8, wherein they are accumulated.

More specifically, and referring now to Figs. 1, 2, 3 and 7, the hot-rolled and machine-straightened bars 2 are loaded in substantially parallel relation as shown, onto downwardly inclined, spaced skid rails such as 11, of a feeder magazine shown generally at 12, so constructed, as explained below, as to provide in conjunction with skid rails 11, slotted passageways such as 13, Fig. 7, for feeding the bars individually and successively, as at 14, in the direction of arrow 15, downwardly under gravity onto cam-actuated ejector mechanisms shown generally at 16. The ejector mechanisms 16, in turn, deliver the bars successively onto canted pairs of driven feed rolls 17, which propel the bars in the direction of arrow 18, into and through the roughing grinder 3. To this end the rolls 17 of each pair are so mounted in relation to each other as to provide a "V" groove 19, Fig. 7, therebetween, into which groove the bars are delivered as at 20, the rolls being driven in the directions of the arrows thereon, Fig. 7. In addition, the roll pairs 17 are adjustably mounted as explained below, in canted relation to the direction of the bars such as 20 delivered thereon, as shown in Fig. 1, whereby, as the rolls rotate, they automatically feed the rotating bars forward in the direction of arrow 18, into the roughing grinder 3.

From the roughing grinder the bars are fed axially onto the run-out 4, from whence they are picked up by the transfer mechanism 5, which is of sprocket and chain construction, as shown in Figs. 2 and 3, and which progressively elevates the bars as at 20f, and delivers them, as at 20e, onto downwardly sloping, spaced transfer skid rails such as 21, from whence the bars roll by gravity onto the skid rails 22 of the feeder mechanism 6, as at 23, Fig. 2. From the feeder mechanism 6 the bars are fed, in a manner identical with that described in connection with feeder mechanism 1, into and through the finishing grinder 7, thence onto a runout, and accumulated in cradle 8, wherein the bars are accumulated under gravity.

With the arrangement shown by 1, only one operator 23 is required to supervise the operations of the entire mechanism described thus far, the operator being in position to gauge the bars, such as 20, passing through the roughing grinder 3, and also to gauge the bars, such as 24, passing into and through the finishing grinder 7, the gauging point being indicated at 24a and 24b. The operator, by manipulating pilot wheels such as 25, available to his reach as shown, can adjust the centerless grinders 3 and 7, to take care of wear on the grinder wheels.

The construction and operation of the feed roll pairs 17 of Figs. 1–3 inc., will now be described more in detail with reference to Figs. 17–20 inc.

Referring to Figs. 17 to 20 inc., each feed roll pair 17, comprises feed rolls 28, 29, keyed respectively to shafts 30, 31, these shafts in turn being journaled to roll supporting or mounting plates 32, 33, through bearings, as at 34, 35, preferably roller or ball bearings. The mounting plates 32, 33 are shown in section in Fig. 18a, referring to which, each mounting plate is provided on its inner face with a circular slot, as at 36a, 36b, for purposes of assembling the two mounting plates 32, 33 in rotatably adjustable relation onto the opposite ends respectively of a pipe-like supporting member 37, the construction of which is most clearly illustrated in the perspective view, Fig. 18b. Referring to Fig. 18b, the supporting member 37 comprises a pipe section 38, which is cut away longitudinally along its base, to provide a cut-out sector or slot 39, and as thus slotted, is inserted at its opposite ends respectively, in conforming apertures of a pair of supporting plates 40, 41, and welded to these plates to provide the assembly of Fig. 18b. The supporting plates 40, 41 are of roughly the inverted U-shaped configuration shown, the upper portions being of arcuate contour in conformity with the contour of the pipe section, and the bases thereof being rectilinear in the horizontal direction, as shown. Reverting to Fig. 18a, the mounting plates 32, 33 are rotatably assembled onto the opposite ends respectively of the pipe section 38, with the opposite ends of the pipe section fit into the circular grooves 36a, 36b of the mounting plates. In the resulting assembly the supporting plates 40, 41 of member 37, provide upstanding flanged portions, against which the mounting plates 32, 33 respectively abut, as shown in Fig. 18a. The components comprising the supporting member 37 and the mounting plates 32, 33 are maintained in the assembled relation shown in Fig. 18a, by means of bolts such as 42, which extend through bolt holes such as 43, provided in the supporting plates 40, 41 of member 37, and which also extend through arcuately shaped slots, provided in the end plates 32, 33, as shown at 44 in Fig. 18. The assembly is thus integrated by means of nuts such as 45 threaded onto the ends of bolts 42. The purpose of the arcuate slots 44 in the mounting plates 32, 33, is to permit of angular adjustments between the mounting plates 32, 33, thereby to adjust the spacing between the feed rolls 28, 29 in accordance with the diameter and speed of the bar stock to be fed.

Still referring to Fig. 18a, the supporting member 37, carrying the assembly described thus far, is in turn mounted on a circular supporting plate 45. To this end the mounting plate 45 is provided with parallel, rectangular grooves, as at 46, see Fig. 14, for reception of the horizontal base portions of the supporting plates 40, 41. The supporting plates 40, 41 are thus assembled in the grooves 46 of the mounting plate 45, are welded thereto to provide an integral assembly. As shown in Figs. 14, 16 and 18a, the mounting plate 45 is provided with a circular opening 47, concentric therewith, and the supporting member 37 is so mounted on the mounting plate 45 that the center of the circular opening 47 is in vertical alignment with the center of the slotted sector 39 of the pipe section 38, and is also in vertical alignment with the midpoint axially of the pipe section 38, in the manner illustrated in Fig. 18a.

As shown in Figs. 16, 18 and 18a, the mounting plate 45 is provided on its underside with a diametrically extending groove 48, into which fits the upper edge of a U-shaped supporting member 49, which is welded in position in groove 48. The supporting member 49 in turn mounts a motor and reduction gear assembly, 50, 51, which drives the rolls 28, 29 in the manner now to be explained. The drive assembly and operation is illustrated in Figs. 17, 18 and 18a. As shown therein, the motor and gear assembly 50, 51, is mounted on plate 49 by means of bolts, as at 52, passing through slotted openings, as at 53, in Fig. 18, provided in the supporting plate 49. The motor 50 drives a shaft 54 through the worm and gear assembly 51. Shaft 54 has keyed thereto a sheave 55 about which passes a belt 56, which also passes about a sheave 57, the latter being keyed to a shaft 58 journaled at its opposite ends to the supporting plates 32, 33 by means of roller bearings, as at 59, Fig. 18a. At each of its opposite ends, shaft 58 has keyed thereto chain sprockets 60, 61, about which pass chains, as at 62, 63, the opposite ends of which pass about other sprockets 64, 65, the latter being keyed respectively to shafts 30, 31. By reason of the driving assembly thus described, the motor 50 drives the feed rolls 28, 29 concurrently and at the same speed of rotation and in the same direction of rotation as indicated by the arrows 66 thereon.

Referring to Fig. 1, each of the roll pairs 17 is independently motor driven in the manner above described with reference to Figs. 17 to 20 inc., the rolls of each pair being mounted in alignment in the direction in which the bars are to be fed. In addition, each of the roll pairs is mounted with the roll axes in adjustably inclined relation or canted with respect to the direction in which the bar stock is to be fed, as illustrated in Fig. 1, for propelling the bar stock into the grinders at a speed determined by the extent of angular inclination of the roll axes relative to the direction of travel of the bar stock, and by the rotative speeds at which the rolls are driven. The mounting of the roll pair assemblies to the above ends is as follows:

Referring to Figs. 1 and 14 to 20 inc., the mounting plate 45 of each roll pair assembly, is of circular configuration and is provided about its outer periphery with an undercut portion providing, as shown in Fig. 18a, a peripheral flange 67 abutting a circular shoulder 68 on the underside. This shoulder fits into a conforming circular opening 70 of a stationary supporting plate 71, while the outer flanged portion 69 of the mounting plate 45 rests on a bearing ring 72, of Micarta or other suitable organic bearing material, which bearing ring in turn rests upon the supporting plate 71. All of the supporting plates 71 are bolted to parallel channel members 73 of a roll feed table shown generally at 74 and described hereinafter. The supporting plates are bolted as at 74a, to the channel members 73. In this way the entire feed roll and motor drive assemblies of Figs. 17 to 20 incl. are so mounted in alignment along the feed table 74, as to be rotatable about their vertical axes with reference to their respective supporting plates 71, thereby to permit of canting the roll axes with respect to the direction of bar stock propulsion, in the manner illustrated in Fig. 1.

Referring to Figs. 14 and 17 to 20 inc., means are provided for concurrently rotating the successive mounting plates 45, mounting the successive roll pairs 17, for adjusting the roll pairs to the same angular inclinations relative to the direction of feed of the bar stock. This adjusting means comprises, for each mounting plate 45, a triangular plate 76, rigidly secured to the associated mounting plate 45 by a pair of bolts as at 77, passing through apertures provided at opposite vertices of the triangular plates 76. The remaining, projecting vertices 78 of the triangular plates 76 are interconnected by successive bars or link members 79, which are pin-connected to the projecting vertices of the triangular plates, as at 80. Referring to Fig. 14, at one end of the thus interconnected triangular plate and link assemblies 76, 79, 80, the final link 81 terminates in an upstanding lug 82, through a tap hole in which a threaded bolt 83 extends, this bolt being held rotatably against lateral displacement by means of a nut 84. The other end of the threaded bolt 83 is in threaded engagement with a block member 85 fixedly secured to the end plates 71. This end of the bolt is provided with a polygonal bolt head 86, for adjusting the bolt in either direction relative to the block member 85, thereby to correspondingly displace the entire link assembly 81, 79, 80, 76, etc., in one direction or in the opposite direction, for concurrently adjusting the angular inclinations of all of the roll pairs 17, in accordance with the rotative adjustments of the mounting plates 45 through the intermediary of the triangular plates 76, rigidly secured to the mounting plates 45 and pin-connected to the links 79 as explained.

The assembly and adjustment of the roll feed table will now be described. Referring to Figs. 14, 15 and 16, the channel members 73, supporting the feed roll assemblies, extend the length of the roll feed table 74. At the opposite ends of this table the channel members are supported on cross bars 87, Fig. 15. Each of these cross bars 87 is mounted upon a pair of screw supports, as at 88, 89, which in turn are threaded through a pair of hub members, as at 90, 91, and these in turn are journaled to an angle member 92 through interposed brass bushings, such as 93, and bearing washers, such as 94, the latter of Micarta or the like. The angle members 92 in turn are supported on upstanding angle members, such as 93, of the feeder supporting framework, shown generally at 93a, Fig. 2.

Each hub member 90, 91 has secured thereto a gear, such as 94, 95, which gears mesh with a pinion 96, which in turn is keyed to a shaft 97, journaled through the upper flange of the angle member 92, shaft 97 having also keyed to its upper end a handwheel 98, whereby adjustment of the handwheel 98 lowers and elevates the cross bars 87, in turn, to correspondingly raise or lower the feed roll table 74.

It is necessary to provide for transverse adjustment of the entire feed roll table 74, in order to compensate for grindstone wear and variation in the size of rods to be fed. This is accomplished as follows: Referring more particularly to Figs. 14–16 inc., each cross bar 87 has bolted to its upper surface a tapped sleeve member 99, bolted to plate 87 as at 100. Threaded through the sleeve member 99 is a screw shaft 101, journaled at its opposite ends to the channel members 73 by means including brass bushings, Micarta washers, and terminal collars 102, 103, 104. The sleeve and screw shaft assembly is mounted between channel members 105 welded to channel member 73.

Referring to Fig. 14, the screw shaft 101 at one end of the table is provided at its opposite ends with a pair of sprockets 106, 107, keyed thereto. A chain 108 passes from one sprocket 106 to a sprocket 109 keyed to a shaft 110, to which is secured a handwheel 111. About the remaining sprocket 107, chain 112 extends to a sprocket 113, keyed to the screw shaft 101a at the far end of the table. The assembly and operation of screw shaft 101a is identical with that of screw shaft 101, per Fig. 15. Thus, manipulation of the handwheel 111 concurrently rotates the screw shafts 101, and to the same extent, thereby to adjust the entire feed roll table 74 and roll stands 17 mounted thereon, in either of the transverse directions illustrated by arrow 115 in Fig. 15, by sliding displacement of the channel member 71 along the cross bars 87.

Accordingly the feed table may be adjusted in elevation by handwheel 98, and may be adjusted transversely by manipulation of handwheel 111.

The cam-actuated ejector mechanisms 16 which discharge the bar stock from the magazine 12, Fig. 7, onto the driven feed roll pairs 17, will now be described with reference to Figs. 7 to 13 inc. Referring to these figures, the ejector mechanism designated generally at 150, comprises an assembly displaceable as a unit and consisting of a base member 155, a height adjusting member 156, and a finger member 157. The base member 155 is of generally rectangular and slab-like configuration, its upper face being longitudinally grooved, as at 158, for slidable reception of the height-adjusting member 156, which sits in the groove in the manner shown, and is longitudinally adjustable therein by means of a screw bolt 159, which extends through a U slot 160 of a projecting lug 161, provided on member 155, the screw bolt 159 threading through a tapped lug 162 formed on the height-adjusting member 156, and extending at right angles thereto as shown.

In addition, the body member 155 is provided with a slot 163, paralleling the groove 158, slot 163 being adapted for reception of the finger member 157, which is pin-connected and thus pivotally secured to the body member 155 by means of a pin 165. This pin 165 extends through the body member 155 and also through an elongated slot 166, formed in the height-adjusting member 156. The base member 155 is provided on its base with with a downwardly projecting portion of 167, Fig. 9, extending longitudinally thereof, this projecting portion being provided on its opposite sides with longitudinally extending, lateral slots 168, 169, for mounting member 155 in locking and sliding engagement on a supporting structure. This supporting structure comprises a pair of laterally spaced, rectangular bars 170, 171, mounted upon a channel member 172 of the feeder mechanism supporting framework, being bolted thereto as at 173, Fig. 9 The bars 170, 171 are faced with bearing members 176, 177, of brass, Micarta or the like, secured thereto by screws, as at 178. It will be observed, Figs. 9 and 10, that these two bearing members 176, 177 extend inwardly in opposite directions from their respective supporting bars 170, 171 lockingly engaging the keyway slots 168, 169 of the ejector base member 155. In this way the ejector base member 155 is slidably supported on the bearing members 176, 177 in locking engagement therewith. The entire ejector assembly, comprising the base member 155, height-adjusting member 156 and ejector finger 157, is thus displaceable as a unit along the bearing members 176, 177 by means of a connecting link 178, one end of which is pin-connected to the base member 155, as at 179, and the opposite end of which is integral with an eccentric sleeve member 180, within which is rotatable an eccentric 181, keyed to a shaft 182.

Referring to Figs. 7, 8a and 10, it will be noted that the finger member 157 is substantially V-shaped, one leg of the V terminating in a trigger or finger portion 183, with the opposite leg 184 extending into a slot 185 of a trigger adjustment plate 186. As shown in Fig. 11, this trigger adjusting plate 186 is of substantially rectangular configuration, having formed therein the substantially rectangular slot 185 referred to. As shown in Figs. 7, 8a and 9, this plate 186 is slidably mounted on the channel member 172, between the upstanding supports 170, 171, and beneath the base portion 167 of the ejector base member 155. At its front end, as viewed in Fig. 7, the trigger adjusting plate 186 has welded thereto a downwardly projecting lug 187, having a U slot formed therein, for reception of an adjusting screw bolt 188, which threads into a nut 189, welded onto the flange of the channel member 172. This permits of longitudinal adjustment of plate 186 for purposes explained below.

Referring to Figs. 7 and 10, the trigger member 157 is provided adjacent its pivotal mounting 165, with an upstanding lug 190 which is tapped for reception of a pin 191. Secured to the upper surface of the trigger base member 155 is a substantially U-shaped trigger spring plate 190a, which is mounted upon and secured to the base member 155 by means of bolts, as at 191a. This spring plate is additionally anchored on the base member 155 by means of a downwardly projecting lug 192, which enters a corresponding slot in the body member, as clearly illustrated in Fig. 7. The spring plate 190a is provided at its opposite ends, as shown in side view, with upstanding lugs 193, 194. The lug 194 away from the trigger member 157, has welded thereto an upstanding pin 195, to the upper end of which is secured one end of a tension spring 196, the opposite end of which is secured to the upper end of the trigger pin 191. In addition an adjusting bolt 197 is threaded through the upstanding lugs 194 of the spring plate 190a, and extends through an aperture of lug 193, in such manner that the far end 198 of the bolt is normally adjacent the upstanding lug 191 of the trigger member 157.

Referring to Figs. 7, 8 and 10, the skid plate 11 is of somewhat hook-shaped configuration comprising an upper portion 11a overlapping a base portion 11b, to provide therebetween a slotted opening 199, along which are positioned a pair of adjusting plates 200, 201. These adjusting plates are provided with elongated apertures, as at 202, 203, through which bolts 204 extend, being tapped to the skid plate 11. The elongated openings 202 of the adjusting plate 200 extend vertically for adjusting plate 200 in the vertical direction for varying the height of the slotted opening 13, Fig. 7, in conformity with the diameter of the bar stock, to be fed in a single layer, as at 14, from the supply of bars 2 carried by the lower portion 11b of the skid plate and held back by the upper portion 11a thereof. The adjusting slots 203 of the adjusting plate 201 extend horizontally for similarly adjusting portion 206 of the slotted opening in conformity with the diameter of the bar stock being fed.

With the foregoing description in mind, the operation of the ejector mechanism to feed the bar stock from the supply 2 thereof onto the feed rolls 17, Fig. 7, is best explained by first describing the ejector mechanism adjustment required to initiate such operation.

Still referring to Fig. 7, and to Fig. 8a, shaft 182 is rotated as explained below, until the ejector mechanism is displaced to its most retracted position to the right in Fig. 7 by the eccentric and link mechanisms 178—181. A bar 209 is now placed in the position shown against the shoulder 210 of the ejector base member 155, this shoulder being set back somewhat, as shown, from the end of the base member, which is downwardly inclined from the shoulder to the extremity of the body member, as at 210a. The bar 209 is thus placed against the shoulder 210 of the base member, and between that and the trigger finger 183, so that it rests upon the beveled cut-out portion 211 of the height-adjusting member 156. The height-adjusting member 156 is thereupon adjusted by means of the threaded bolt 159 until the top of the bar 209 is just flush with the upper surface 212 of the ejector base member 155. The trigger-adjusting plate 186 is thereupon adjusted by means of the threaded bolt 188 until the tip or finger 183 of the trigger 157, firmly engages the bar stock 209, this engagement resulting from the engagement of the rear surface 213 of the slot 185, in the trigger-adjusting plate 186, with the depending leg 184 of the trigger member 157. The threaded bolt 197 of the spring plate assembly 190a is now adjusted until its far end 198 of bolt 197 is spaced a slight distance, for example 1/16 to 1/8 inch, from the upstanding lug 190 of the trigger member 157.

When these adjustments have been made with respect to bar 209, the remaining bars 14 are permitted to roll by gravity against bar 209, and rotative power applied to shaft 182. Rotation of shaft 182 produces the following sequence of operations as regards the delivery of the bar stock onto the feed rolls 17. As shaft 182 starts to rotate, the entire ejector mechanism, comprising elements 155, 156 and 157 is displaced toward the left as viewed in Figs. 7 and 10. During the initial portion of the traverse, the tension spring 196 maintains the trigger 157 in the elevated position shown in Fig. 7, with the finger 183 thereof firmly engaging bar 209. This status continues until the depending arm 184 of the trigger member 157 engages the front wall 218 of the slot 185 in the trigger-adjusting plate 186, and in the manner shown in Fig. 8a. Thereupon continued displacement of the ejector assembly towards the left, causes the trigger member 157 to be rotated counter-clockwise about its pivotal support 165, against the restoring action of spring 196, whereby the trigger or finger portion 183 thereof, is depressed from the position 183 into the position 183a below the level of the beveled surface 211 of the height-adjusting plate 156, whereupon the bar 209 is released to roll down the beveled surface 211, into the V 19 formed between the successive pairs of feed rolls 17 into the position illustrated by the bar 20, Fig. 7.

Meantime, and slightly prior to the engagement of the trigger arm 184 with the slot face 218 of member 186, the shoulder portion 210 and upper surface 212 of the ejector base member 155, passes under the center line of the next bar 219 in the magazine, as illustrated in Fig. 8a, thus to hold the remaining bars in the magazine in the position shown while bar 209 is being released. Bar 219 and those above it in the magazine are thus maintained in the position shown, while the ejector mechanism completes its traverse to the left to discharge bar 209. As the ejector mechanism starts back on the return stroke, the restoring force of the stretched spring 196 will rotate the trigger 157 clockwise to the extent permitted by continued engagement of portion 184 thereof with the front wall 218 of slot 185, until the trigger lug 190 hits the end 198 of stop bolt 197. This position is maintained until next bar 219 falls into the ejector against finger tip 183 at about the end of the return stroke. The weight of this bar and ones above it tend to rotate trigger counter-clockwise until trigger part 184 contacts the rear slot face 213, during which spring 196 is tensioned and the end 198 of stop bolt 197 is separated from trigger part 190. Further displacement of the ejector mechanism to the right will disengage trigger member 184 from the front slot face 218, thus permitting the trigger lug to engage stop 198. Meantime, upon return of the ejector mechanism substantially to the position shown in Figs. 7 and 10 of the drawings, the next bar 219 will fall into the position previously occupied by bar 209, while the other bars in the magazine move down the diameter of one bar. At the end of the return stroke, the trigger base 184 will engage the rear slot face 213 and thus rotate the trigger slightly clockwise, to space the trigger lug 190 slightly away from stop 198.

As the ejector mechanism again starts forward, i. e., to the left in the drawing, on the next ejector stroke causing the depending arm 184 of the trigger to disengage the rear slot face 213, the tension spring 196 will maintain the trigger in the elevated position shown, with the finger tip 179 thereof firmly engaging the bar 209, this status being maintained until the depending arm 184 of the trigger again engages the front slot face 218, whereupon continued movement of the ejector mechanism toward the left rotates the trigger mechanism counter-clockwise, thereby to depress the finger 179 below the beveled surface 211 of the height-adjusting plate 156. During this portion of the stroke the spring 196 will be increasingly stretched and tensioned up to the end of the forward stroke in the manner above discussed and as indicated at 193a. As now, the mechanism starts back, on the return stroke the depending arm 184 of the trigger will be continuously engaging the front slot face 218 by virtue of the tension action of the spring 196. Meantime, however, the trigger member 157 will be rotated clockwise until the trigger lug hits the end 198 of stop bolt 197, the further sequence of operations being as above described.

Referring to Fig. 7, a supply of the bar stock to be centerless ground is, as above explained, piled into the rear ends of the lower portion 11b of the skid plate 11, in the manner illustrated at 2. If no mechanism were provided for adjusting the piled stock bars 2, they would tend to jam at the entrance to the magazine slot 13, thereby tending to prevent uniform feeding of the bars in a single layer into this slot in the manner shown. In order to provide a mechanism for suitably adjusting the pile of stock bars 2 to prevent this jamming, there is included in each eccentric assembly a so-called shuffle bar attachment 223, this attachment being secured by means of a bolt 224, to a shuffle bar 225, this shuffle bar being suitably mounted on the eccentric assembly in the manner explained hereinafter, and being provided with a lower extension 226 integral therewith, containing a longitudinal slot 227, which is pin-connected as at 228, to the adjacent skid plate 11.

It will be noted that the shuffle bar attachment 223 is provided with a suitably shaped, angular contact surface 229, adapted to engage the bar stock 2 as shaft 182 is rotated in the manner aforesaid. Since the shuffle bar is pin-connected at its base 226 for longitudinal displacement only, this connection in conjunction with the eccentric movement imparted thereto by the eccentric 181 keyed to shaft 182, causes the angular face 229 of the shuffle bar attachment 223 to partake of a substantially elliptical movement as indicated at 230, in a counter-clockwise direction as indicated by the arrows thereon, when the shaft is rotated in the direction of the arrows thereon. Accordingly, as shaft 182 rotates, the contact face 229 of the shuffle bar attachment will engage the bar stock 2 at the left, and will displace bar 231 thereof to the right sufficiently to permit bar 232 above it, which abuts the shoulder 208 of the skid plate portion 11b, to drop and roll into the slot 13 against the other bars already contained therein.

Referring now to Figs. 7, 10 and 13, the assembly on shaft 182 of the eccentric 181, the connecting links 178 to the ejector mechanism, the sleeve member 180 and the shuffle bar 225, is as follows: The eccentric 181 is mounted upon and keyed directly to shaft 182 by means of a keyway spline 229, Fig. 13, and clamping bolt 230, Fig. 7. Surrounding the eccentric 181 is a brass bearing ring 234 which is slidably mounted with respect to the eccentric 181, and surrounding the brass bearing ring 234, and slidably mounted with respect thereto, is shuffle bar 225. The assembly as thus described, is held in place by the ring ends 178a of the connecting links 178, which ring ends abut the assembly 181, 234 and 225, on opposite sides thereof, and are held in position by means of pins, as at 235, which extend through bores in the ring members 178a, and the brass bearing ring 234, the pins having secured to the outer ends thereof, Tru-arc retaining rings, or other equivalent locking device. By virtue of this arrangement the ring ends 178a of the connecting links, which overlap both the eccentric 181 and the shuffle bar ring 225, function to maintain the shuffle bar in alignment with the eccentric during rotative movement of the latter.

In the description thus far, the overall construction of the feeder mechanism has been generally described, in addition to which the essential mechanical components thereof have been described in detail. Attention will, therefore, now be directed to the electrical drive, circuits, switches, cams and clutches, whereby operation of the feeder is rendered fully automatic to feed the bars successively from the magazines into the grinders. These features are best illustrated in operative relation to each other in Fig. 3, in conjunction with which reference is also made to Figs. 1 and 3 to 6 inc., 19 and 20, the latter for further details.

Referring to these figures, as a bar of stock such as 20 is fed by the feed rolls 17 into the grinder, it passes under a switch wheel 230 which rides on top of the bar being fed, in the manner shown, being rotated by the rotating bar. This switch wheel controls a switch and solenoid assembly, which actuates the ejector mechanism for delivering the next bar onto the feed rolls, as soon as bar 20, as shown therein, has passed beyond the switch wheel 230.

To this end the switch wheel 230 is journaled to switch bar 231, which latter in turn is pivotally secured at its far end 232 to a supporting member 233, carried by the end plate 71 at the grinder end of the feed roll table. The bar 231 is thus pivotally secured to support 233 for rotation about a horizontal axis, so that the wheel 230 may drop down when a bar has passed beyond it into the grinder. Pivotally connected at approximately the mid-point of the bar 231, as at 234, is a link member 235, the lower end of which is pin-connected, as at 236, to a substantially horizontally extending link member 237, the far end of which is in turn pivotally secured, as at 238, to the support member 233, for permitting the link member 237 to rotate about a horizontal axis. Mounted beneath the projecting end of the link member 237 is a microswitch 239, on which is pivotally mounted, as at 240, a switch arm 241 on the projecting end of which a roller 242 is so mounted as to be engageable by the link member 237 when the latter is depressed in the manner explained below.

The switch arm 241 engages a vertically displaceable switch contact 242, the latter being normally maintained out of contact with a stationary switch contact 243, by means of a compression spring 244, surrounding the switch arm 242. Pin-connected to an intermediate point of link member 237, is a member 245, the upper end of which is pin-connected, as at 246, to the plunger 247 of a solenoid 248, which is energizable in the manner explained below, over a circuit which includes conductors 249.

In the operation of the device, so long as the switch wheel 230 is riding on a piece of bar stock, such as 20, the switch bar 231 and the link members 235 and 237, will be maintained in the elevated position shown more particularly in Fig 20, so that the contacts 242, 243 of the microswitch 239 will be open. When, however, the bar 20 passes beyond the contact wheel 230, the wheel will drop down between feed rollers 28, 29 in the manner illustrated by the dotted lines 230a, in Fig. 20, thus to depress the link member 237 to the dotted position shown at 237a, causing this member to depress the roller 242 to the position shown at 242a, thereby actuating the micro switch 239 to cause the contact 242 to engage contact 243. This completes a circuit over connections 250 to actuate a solenoid 251, Fig. 3, mounted at the far end of the feeder from the switch wheel 230, which solenoid 251 controls the rotation of the ejector mechanism cam shaft 182, Figs. 7 and 19, as explained below.

Referring to Figs. 3 and 20, the energizing circuit for solenoid 251 includes in addition to contacts 242, 243 of the microswitch 239, and connection 250 therefrom, a power supply line 252, to one side of which one of the connections 250 extends, while the other connection 250 extends over a conductor to solenoid 251, a return path from which extends over conductor 253 to the opposite side of the power line.

Referring to Figs. 3, 5 and 6, the plunger 254 of the solenoid 251, is pin-connected at 255, to a trip link 256 of a clutch member 257 of the so-called single revolution type, such as the Hilliard No. 4 clutch. To this end the trip link 256 is pin-connected to a fixed support 258, at an intermediate point thereof, as at 259. Accordingly, when the solenoid 251 is energized in the manner aforesaid, the trip link 256 is rotated clockwise, thereby to disengage the trip link 256 from the stop 260 of the clutch 257, thereby releasing the same to make a single revolution, as explained below.

Referring to Figs. 3, 5 and 6 for an explanation of the clutch operation, a sheave 261 is keyed to a sleeve 262, which is normally freely rotatable about shaft 182. Sheave 261 is continuously driven from an electric motor and gear assembly 262, having keyed thereto a sheave 263 which drives sheave 261 by means of a belt 264 passing about the two sheaves. The sleeve 262 is secured to an outer clutch member 264, drivingly engageable by an inner clutch member 265, upon retraction of a tension spring 266. Tension spring 266 is normally tensioned to disengage the inner clutch member 265 from the outer clutch member 264, by engagement of the trip link 256 with the stop 260. When, however, the trip link is disengaged from the stop in the manner aforesaid, spring 266 is retracted to cause the inner clutch member 265 to drivingly engage the outer clutch member 264 and thus rotate the shaft 182 in the direction of the arrow 267. The clutch stop 260 is formed on a helically shaped cam member 265 on which the trip link 256 is released, as explained below, to cause the trip link to engage the helical surface 268 as explained, so that upon completion of a single revolution of the clutch, the trip link 256 will again engage the stop 260, thereby tensioning the spring 266 to release the clutch, thus preventing further rotation of shaft 182. Since the construction and operation of the Hilliard type clutch is well understood and described in the literature, no more detailed explanation as to the construction and operation of this clutch is required.

Referring to Figs. 1 and 3, shaft 182 extends the entire length of the feeder mechanism as shown, being journaled, as at 269, to the skid plates 11. As explained above in connection with Figs. 7 to 12 inc., the rotation of shaft 182 actuates the ejector mechanism to deliver a succeeding bar of stock onto the feed rolls 17. Referring to Figs. 3 and 4, shaft 182 has mounted thereon and keyed thereto, a cam wheel 270, having formed on its outer peripheral surface, a single recess 271 in which normally rests a roller 272 of a microswitch 273, similar to microswitch 239 of Fig. 20. Microswitch 273 is connected by means of conductors 274 over an energizing circuit 275 extending from the power supply line 252 to solenoid 248, the latter controlling the elevation of the contact roll 230, Fig. 20. As a result of this arrangement, as soon as shaft 182 starts to rotate in the manner above described, the cam roller 272, Fig. 4, is displaced from the cam recess 271, thereby to actuate the microswitch 273, for energizing solenoid 249 over circuit 275. Energization of the solenoid 248 elevates the solenoid plunger 245, and this in turn elevates the link members 237 and 235, thereby to elevate shaft 231 of the switch wheel 230 above the level of the entering bar stock 20, whereby the next bar being fed into the grinder by the feed rolls 28, 29, passes under the switch wheel 230. As soon, however, as shaft 182 has completed its single revolution as aforesaid, the cam 272, Fig. 4, of microswitch 273, will again enter the recess 271 of the cam wheel 270, thereby to open microswitch 273, thus de-energizing solenoid 248, Fig. 20, which in turn, by releasing the plunger 247, permits the switch wheel 230 to fall by gravity onto the next succeeding bar being fed into the grinder, in the manner illustrated by the full line showing in Fig. 20.

It will be recalled from the foregoing description that the rotation of shaft 182 was initiated by the switch wheel 230 dropping down between the feed rolls 28, 29 as a bar length passed beyond the switch wheel into the grinder, due to the fact that when the switch wheel drops down in this fashion, it actuates microswitch 239, in turn to energize the clutch 267, through which shaft 182 is driven from the motor 262. It has also been explained immediately above how rotation of shaft 182 energizes the solenoid 248 again to elevate the switch wheel 230, immediately upon initiation of the shaft rotation, by disengagement of the cam 272 from the cam wheel recess 271. This elevation of the switch wheel by energization of solenoid 248, in turn causes the link member 237, Fig. 20, to disengage the roll 242 of microswitch 239, thereby opening this microswitch and in turn opening the energizing circuit for solenoid 251, shortly after shaft 182 starts to rotate. In consequence of this prompt release of solenoid 251 the trip link 256 thereof is rotated counter-clockwise, under the action of gravity until it bears against the helical surface 26 of clutch cam 265, whereby upon completion of a single revolution of the clutch the trip link 256 engages the clutch stop 260, thereby to release the clutch and prevent further rotation of shaft 182.

Thus, to review the sequence of operations with reference to Fig. 3: Assuming the switch wheel 230 to be initially riding upon a bar of stock such as 20, being fed into the grinder 3, as this bar of stock passes beyond the switch wheel the latter will drop down between the feed rolls 28, 29, thus to actuate microswitch 239, and thereby energize solenoid 251. Energization of solenoid 251 will in turn cause clutch 257 drivingly to engage shaft 182 to start the same rotating from the drive applied from the motor 262. As soon as this shaft starts to rotate, the roll 272 of microswitch 273 will be disengaged from recess 271 of cam wheel 270, thus to actuate the microswitch, thereby to energize solenoid 248, in turn to elevate the switch wheel 230 above the level of the bar stock fed by feed rolls 28, 29. Elevation of the switch wheel 230 opens the contacts of microswitch 239, thereby to de-energize solenoid 251, so that the trip link 257 thereof will engage the clutch stop 260 as soon as a single revolution of shaft 182 is completed. Upon completion of this single revolution the roller 272 of microswitch 273 will again enter recess 271 in the cam wheel 270, thereby to energize solenoid 248, de-energization of which permits the switch wheel 230 to fall by gravity onto the next bar of stock being fed into the grinder over rolls 28, 29.

The above completes the detailed description as to the construction and operation of the feeder mechanisms which feed the bar stock onto the centerless grinders. Attention will accordingly now be directed to a detailed description of the run-out and transfer mechanism for delivering the bar stock fed through the roughing grinder into the finishing grinder.

Figs. 1–3 and 21–26 inc. show the lay-out and details of the delivery and transfer mechanisms in accordance with the invention, for receiving the bar stock delivered from the roughing grinder, and for automatically transferring same to the feeder mechanism of the finishing grinder. Before entering into a detailed description of these mechanisms, the operations involved will be briefly reviewed as follows: A bar of stock such as 20a, Fig. 3, is fed by the roughing grinder 3 onto and along a run-out trough 4, and is delivered thence by means of a series of eccentric fingers, and skid plates to chain and sprocket elevating mechanism 5, in the manner illustrated at 20 to 20f inc., onto the downwardly inclined transfer plates 21, from whence the bars roll by gravity onto the skid plates 22 of the feeder mechanism 6, which feeds the bars into the finishing grinder 7.

To this end the entrance portion of the run-out trough 4 comprises a series of angle bars 280, followed by a series of grooved idler rolls 281 of V section, Fig. 23, mounted in spaced alignment along and upon a delivery table 282, for receiving, supporting and guiding the bar stock, fed therealong from the grinder 3 in the manner illustrated by bar 20. The channel members 284 are mounted on the supporting table 282 by means of interposed web members or plates 283, channel members 284 and I beams 285, Fig. 21, welded or otherwise secured together in the assembled relation shown. Referring to Fig. 21c, the idler rolls 281 are mounted on shafts 286, journaled to bearing supports as at 287, 288, mounted upon upstanding, supporting channel member 289, the latter being mounted upon and bolted to the table 282 as at 290.

Referring to Figs. 1, 2, 21 and 21c, the transfer plates 21 are mounted upon upstanding channel supports 291 of a supporting framework shown generally at 292, to which supports are also secured plate members 293, these various members being bolted together as at 294. The opposite ends of the transfer members 21 are bolted, as at 295, Fig. 2, to the supporting framework 22a of feeder mechanism 6.

Journaled through the plate members 293 is a shaft 303 extending parallel to and approximately the length of the delivery table 282. This shaft is driven intermittently, the latter, as explained below, from an electrical motor 304, through a reduction gear at 305, having a driven shaft to which is keyed a sheave 306, about which passes a belt 307 which also extends about a sheave 308 of a clutch mechanism 309, of the single revolution type, such as the Hilliard No. 4 clutch, this clutch mechanism being identical in construction and operation with clutch 257 shown in Figs. 5 and 6 and described with reference thereto. Clutch 309 is mounted on shaft 303 in the same manner that clutch 257 is mounted on shaft 182, Figs. 5 and 6. That is to say, sheave 308 is normally freely rotatable with respect to shaft 303, but drives this shaft through clutch 309, upon disengagement of the trip link 310, Fig. 2a, from the clutch stop 311, in the manner explained below.

Mounted along and keyed to shaft 303, adjacent each of the transfer plates 21, is an eccentric 312. Surrounding and rotatably mounted on each eccentric is a ring portion 313 of a finger member 314, each finger member being held in position on its eccentric by means of a pair of facing rings, as at 315, 316, Fig. 21b, positioned on opposite sides, respectively, of the eccentric, and in overlapping relation to the eccentric 312 and the ring portion 313 of the finger member 314 as shown, the assembly being held in the assembled relation shown, by means of pins 317 passing through holes appropriately drilled in the ring portion 313 of the finger member, and in the facing members 315, 316.

The eccentrics and finger assemblies 312, 314, are positioned along shaft 303 in the spaces between adjacent angle member 280 and idler rolls 301, as shown in Fig. 3. Each finger member 314 has formed on its upper end, a substantially horizontally extending finger portion 314a, adapted to engage and elevate the bar stock, as explained below, and has also formed on its lower portion, a downwardly extending lug 314b containing an elongated slot 314c, through which a pin 315 extends, the pin threading into the adjacent plate member 293. In consequence, as shaft 303 is rotated, the finger portion 314a will follow an elliptical path, as indicated at 316, Figs. 21 and 21c.

Mounted upon and keyed to shaft 303, adjacent each eccentric, is a small sprocket 318, above which is mounted a larger sprocket 319, the latter being journaled to a bearing stud 320 which, in turn, is rigidly secured to the adjacent transfer plate 21. Passing about each pair of sprockets 318, 319 is a chain 321, having links engaging the sprocket teeth. Secured to the chain 321 at aligned, spaced intervals therealong, are a series of fingers, as at 322.

By virtue of this arrangement, as shaft 303 is rotated, the finger members 314a will follow the elliptical path 316 above described, starting out below a bar of stock, such as 20, resting in the run-out trough, thereupon elevating the same in the manner illustrated at the successive positions 20 to 20d inc., and finally depositing the bar stock on the downwardly inclined surfaces 325 of the plate members 293, from whence the bars roll by gravity against the endless chain 321, in the manner illustrated at 20e, whereupon the fingers 322 of the chain will engage the bar and elevate the same in the manner illustrated at 20f, until the bars are delivered onto the downwardly sloping transfer plates, as at 20g, from whence the bars roll by gravity onto the skid plates 22 of the feeder mechanism 6 in the manner illustrated in Fig. 2.

As was explained above, shaft 303 is driven by motor 304 through the single revolution clutch 309, upon disengagement of the trip link 310 from the clutch stop 311, Fig. 2a. The trip link is controlled by a solenoid 335, and for this purpose the far end of the trip link is pin-connected to a fixed support, as at 336, and is pin-connected at an intermediate point thereof, as at 337, to the solenoid plunger 338. The solenoid 335 is energized from the power source 252 through normally open contacts of a microswitch 339, the obvious circuit connections being omitted for simplicity of showing.

Referring to Figs. 23 and 24, the microswitch 339 is mounted upon the channel support 289, at the far end of the run-out table 282 from that of the grinder 3. Switch 339 is provided with a displaceable switch arm 340, which is actuatable by a cam member 341, the latter keyed to one end of a shaft 342, which is journaled through spaced, upstanding bearing members 343, 344, mounted on opposite sides, respectively, of the supporting channel member 289. Also keyed to shaft 342 between the bearing members 343, 344, is a plate-like trigger member 345, against which a bar of stock such as 20, advancing along the run-out table, strikes or abuts, thus rotating the trigger member in a counter-clockwise direction, Fig. 24, from the position 345 to the dotted line position 345a, whereby the cam member 341 is rotated from the full line to the dotted line positions shown, thus to actuate the microswitch 339 and thereby energize the solenoid 335. Energization of the solenoid 335, in turn, disengages the trip link 310 from the clutch stop 311, Fig. 2a, thus to initiate rotation of shaft 303. The resulting rotation of shaft 303 causes the finger members 314 to lift the bar of stock 20 from the run-out trough in the manner described above, thereby to disengage the bar of stock from the trigger member 345, which is thereupon returned to the normal or full line position shown, by virtue of the action of a restoring tension spring 346, one end of which is connected to a fixed support, as at 347, while the opposite end is connected, as at 348, to an extension lug 349, which is integral with the cam member 341. This restoration of the trigger plate 345, immediately opens the microswitch 339, thus to de-energize the solenoid 335, whereby, as soon as the single rotation of shaft 303 is complete, the trip link 310 will again engage the clutch stop 311, thus to arrest further rotation thereof.

In this way, as each bar of stock fed through the roughing grinder 3, is advanced along the run-out trough 4 until it reaches the far end thereof, it actuates the trigger plate 345 to rotate the shaft 303 once for each such bar, whereby the bar is elevated by the finger chain and sprocket mechanism one step, and is advanced a further step by the next bar entering the run-out trough, and so on until each bar is ultimately delivered onto the transfer plates 21 in the manner illustrated at 20 to 20e inc.

Figs. 21, 23, 25 and 26 show mechanisms for adjusting the run-out table 282, both vertically and horizontally. Vertical adjustment is required for suitably adjusting the elevation of the run-out trough in relation to the diameter of the bar stock being fed. Transverse adjustment is required for maintaining the run-out trough in alignment with the long bar of the grinder as the latter is variably displaced, due to wearing down of the grinding stones. For automatically maintaining this transverse displacement, the run-out trough is secured to the long bar 350, Fig. 1, of the grinder 3. The transverse displacement mechanism comprises a pair of transversely extending run-out supports, shown generally at 350, Figs. 2, 22 and 23, which supports are disposed beneath the run-out table 282 at the opposite ends thereof. Each of these supports comprises a substantially rectangular metal housing 351, open at the top and within which are mounted on spaced shafts 351, 352, extending longitudinally of the table length, a pair of roller or ball bearings 353, 354, the outer race members 355, 356 of which project slightly above the top of the housing 351, as at 357, thereby to support the run-out table 282 in transversely displaceable relation with respect to the housing 351. The housing 351 is in turn mounted on threaded studs on a pair of upstanding stud members 358, 359, disposed at opposite sides of the housing, respectively, these studs having threaded intermediate portions, as at 360, 361, for threading respectively through the hubs 362, 363 of a pair of gears 364, 365, both of which mesh with a pinion 366 keyed to an upstanding shaft 367, rotatable by means of a handwheel 368 secured on the shaft. The studs or shafts 358, 359 and shaft 367 are journaled through the horizontally disposed flange 369 of an angle member 370, forming part of the supporting structure 371 of the run-out and transfer mechanisms. Brass bushings or otherwise suitable bearing members 372, are interposed between flange 369 of the bearing surfaces, such as 373, of the gears and pinions 364–366, inc. For steadying the gear and pinion shafts their lower ends are likewise journaled through a horizontally extending plate 374, spaced below the flange 369 of the angle member and secured to the vertical portion thereof. As a result of this arrangement and assembly, each end of the run-out table may be elevated or lowered, as desired, by manipulation of the handwheel 368.

As explained above, transverse displacement of the run-out table 282 with respect to the supporting structures 350, results from the fact that the run-out table is supported on the outer races of the bearing members 354, in slightly spaced relation to the bearing housings 351, as indicated by the spacing 375. Also, to assure that the run-out table will be transversely displaced to the same extent throughout, and free from skewing action, a rack such as 376 is secured to the underside of the run-out table 282, one of these racks being disposed in each of the support housings 351. These racks 376 mesh with pinions, as at 377, which are keyed to a shaft 378, which is journaled through the housings 351 and extends between the two supporting structures 350 disposed, respectively, at opposite ends of the run-out table 282.

As was mentioned above, the long bar 350, Fig. 1, of the roughing grinder 3, is secured to the run-out trough for automatically maintaining the run-out trough in alignment with the long bar of the grinder as the latter is variably displaced due to wear on the grinder stones. The details of this arrangement are best shown in Figs. 22 and 23, referring to which, there is mounted in spaced relation, on one side of the upstanding I beam 285, a pair of angle members 379, 380, which retain in sliding engagement therewith, a plate member 381, to which is secured a handle 382. Secured to the end of the long bar fixture 350, on the delivery side of the roughing grinder 3, is a depending plate 383, having provided therein a slotted opening 300, into which the sliding plate 381 may be slid for linking the transversely displaceable run-out trough and table assembly 280-285 inc. with the long bar 350, and thereby automatically maintaining the two in alignment as the long bar 350 is displaced with wear on the grinder wheels. This transverse displacement of the run-out trough assembly is limited to a matter of but a few inches, whereas greater transverse displacement of the grinder long bar 350 is required for inserting a new grinder wheel in the grinder. When this occurs, the plate 381 is displaced, by means of handle 382, sufficiently to the left, as viewed in Fig. 22, to disengage this plate from the slotted opening in plate 383. After a new grinder wheel has been thus inserted, linking of the long bar and run-out trough assembly is secured by sliding the plate 381 back into the slot 300.

Referring to Figs. 21 and 23, there is mounted upon and keyed to the eccentric shaft 303, a stop cam 384, the outer periphery of which is of helical contour, as shown at 385, to provide a stop surface 386, engageable by a stop member 387, which is pivotally secured at one end 388 thereof to a fixed support 389. The function of this stop cam 384 and stop member 386 engageable therewith, is to prevent the weight of the finger members 314, Fig. 3, from rotating shaft 303 under the weight of the fingers when the shaft 303 is in the rest position. To this end the stop surface 386 of the cam is in the upper position shown in the rest position of shaft 303, and in this position is engageable by the link member 387, against the stop of which the link member falls by gravity as the cam rotates.

What I claim is:

1. In combination: a pair of fabricating units for operating on successive lengths of elongated stock; a feeder unit for each fabricating unit for automatically feeding said stock into said fabricating unit; a transfer mechanism for receiving the stock passing through one unit and transferring the same to the feeder of the remaining fabricating unit; each said feeder unit comprising a series of driven rolls and means for continuously driving the same for feeding successive lengths of said stock longitudinally into the associated fabricating unit, a feeder magazine for holding a supply of said stock lengths in substantially parallel relation, a reciprocable ejector mechanism for transferring successive lengths of said stock from said magazine onto said feeder rolls, and means for driving said ejector mechanism, means responsive to passage of a section of said stock along said feeder rolls and into the associated fabricating unit for energizing said driving means to actuate said ejector mechanism to deliver a succeeding section of stock onto said feed rolls, and means responsive to said delivery for deenergizing said driving means; said transfer mechanism comprising a runout trough for receiving stock delivered by a first said fabricating unit, an intermittently actuated elevating means for elevating said stock from said runout trough to the feeder magazine of the next unit, means responsive to delivery of a section of said stock onto said run-out trough for energizing said elevating mechanism, and means responsive to a preselected elevation of said stock above said runout trough for deenergizing said elevating mechanism.

2. In combination: a pair of fabricating units for operating upon elongated stock, a feeder for each fabricating unit, for automatically feeding successive lengths of said stock into said units, respectively, each feeder including an aligned series of driven rolls for feeding and guiding said stock lengths successively and longitudinally into a fabricating unit, a magazine sloping downwardly toward said feed rolls for feeding a supply of said stock lengths under gravity toward said rolls, an ejector reciprocable for transferring said stock lengths successively from said magazine onto said rolls, a driven shaft eccentrically linked to said ejector for reciprocating the same, a clutch actuatable to couple said driven shaft to a driving shaft, a first switch means positioned adjacent said fabricting unit and responsive to transit of a stock length along said feeder rolls into said fabricating unit and beyond said switch means, for actuating said clutch to rotate said driven shaft and reciprocate said ejector for delivering a succeeding stock length onto said rolls, and means responsive to rotation of said driven shaft for releasing said clutch upon completion of a single revolution of said driven shaft, a runout and transfer mechanism for transferring stock lengths delivered from one fabricating unit to the feeder of the next fabricating unit, said mechanism comprising a runout trough into which said stock lengths are successively delivered, an elevating mechanism actuatable to elevate said stock lengths from said runout trough onto the magazine of the feeder for the second fabricating unit, and means including a switch actuating element positioned at the far end of said runout trough from said first fabricating unit, and actuatable by propulsion of a stock length thereagainst, for energizing said elevating mechanism.

3. In combination: a pair of fabricating units for operating on successive lengths of elongated stock; a feeder unit for each fabricating unit for automatically feeding said stock into said fabricating unit; a transfer mechanism for receiving the stock passing through one unit and transferring the same to the feeder of the remaining fabricating unit; each said feeder unit comprising a series of driven rolls and means for continuously driving the same for feeding successive lengths of said stock longitudinally into the associated fabricating unit, a feeder magazine for holding a supply of said stock lengths in substantially parallel relation, a reciprocable ejector mechanism for transferring successive lengths of said stock from said magazine onto said feeder rolls, and means for driving said ejector mechanism, means responsive to passage of a section of said stock along said feeder rolls and into the associated fabricating unit for energizing said driving means to actuate said ejector mechanism to deliver a succeeding section of stock onto said feed rolls, and means responsive to said delivery for deenergizing said driving means; said transfer mechanism comprising a runout trough for receiving stock lengths delivered from a first said fabricating unit, a driven shaft paralleling said trough, elevating means including sprockets secured to said shaft and chains extending therefrom to other sprockets mounted about said trough, together with stock engaging fingers spaced along and secured to said chains, and other finger members eccentrically linked to said shaft and having slotted lower portions pin-connected to fixed supports, and substantially horizontally extending upper arms adapted to engage and lift said stock lengths from said trough, upon rotation of the shaft and to deliver the same onto the finger members of said chains, a single revolution clutch actuatable to couple said driven shaft to a driving shaft, and means for actuating said clutch upon delivery of a stock length onto said runout trough, said means including a switch actuatable by abutment of said stock length against a trigger member resiliently mounted at the far end of said trough from said fabricating unit.

4. In an apparatus of the character described, a transfer mechanism for receiving elongated stock lengths delivered thereto from a fabricating unit, and transferring the same to another fabricating unit, said mechanism comprising: a runout trough for receiving said stock lengths, a driven shaft paralleling said trough, elevating means including sprockets secured to said shaft and chains extending therefrom to other sprockets mounted above said trough, stock engaging fingers spaced along and secured to said chains, and finger members eccentrically linked to said shaft and having slotted lower portions pin-connected to fixed supports and substantially horizontally extending upper arms adapted to engage and lift said stock from said trough upon rotation of said shaft and to deliver the same onto the finger members of said chains, a single revolution clutch actuatable to couple said driven shaft to a driving shaft, and means for actuating said clutch upon delivery of a stock length onto said runout trough, said means including a switch actuatable by abutment of said stock length against a trigger member resiliently mounted at the far end of said trough from said fabricating unit.

5. In an apparatus of the character described, a transfer mechanism for receiving elongated stock lengths delivered from a fabricating unit, and transferring the same to another fabricating unit, said mechanism comprising: a runout trough for receiving said stock lengths, means mounting said trough for elevational adjustment and transverse displacement, a driven shaft paralleling said trough, elevating means including sprockets secured to said shaft and chains extending therefrom to other sprockets mounted above said trough, stock engaging fingers spaced along and secured to said chains, finger members eccentrically linked to said shaft and having slotted lower portions pin-connected to fixed supports, and having substantially horizontally extending upper arms adapted to engage and lift said stock lengths from said trough upon rotation of said shaft and to deliver the same onto said chain fingers, a single revolution clutch means actuatable to couple said driven shaft to a driving shaft, and means for actuating said clutch upon delivery of a stock length onto said runout trough, said means including a resiliently mounted trigger member positioned at the far end of said trough from said fabricating unit, and actuatable by abutment of said stock lengths thereagainst, a switch responsive to actuation of said trigger member and a solenoid responsive to actuation of said switch, said solenoid actuating a trip link of said clutch for actuating said clutch for a single revolution of said driven shaft.

6. Apparatus for automatically feeding successive lengths of elongated stock into a fabricating unit comprising: an aligned series of driven feed rolls for feeding and guiding said stock lengths successively and longitudinally into said fabricating unit, a magazine for containing a supply of said stock lengths, an ejector reciprocable to transfer said stock lengths successively from said magazine onto said rolls, a driven shaft eccentrically linked to said ejector for reciprocating the same, a clutch actuatable to couple said driven shaft to a driving shaft, a first switch means positioned adjacent said fabricating unit and responsive to transit of a stock length along said rolls into said fabricating unit and beyond said switch means, for actuating said clutch to rotate said driven shaft and reciprocate said ejector, for delivering a succeeding stock length onto said rolls, and means responsive to said rotation of said driven shaft for releasing said clutch upon completion of a single revolution of said driven shaft.

7. Apparatus for automatically feeding successive lengths of elongated stock into a fabricating unit comprising: an aligned series of driven feed rolls for feeding and guiding said stock lengths successively and longitudinally into said fabricating unit, a magazine for containing a supply of said stock lengths, an ejector reciprocable to transfer said stock lengths successively from said magazine onto said rolls, said ejector including a pivotally mounted ejector member having a finger portion adapted to receive and release successive stock lengths, and an arm operable between a pair of spaced stops, one said stop engaging said arm on the back stroke of said ejector for elevating said finger portion to receive a length of said stock under gravity from said magazine, and said second stop engaging said arm on the forward stroke of said ejector for depressing said finger portion to deliver said stock length under gravity therefrom onto said feed rolls, a driven shaft eccentrically linked to said ejector for reciprocating the same, a clutch actuatable to couple said driven shaft to a driving shaft, a first switch means positioned adjacent said fabricating unit and responsive to transit of said stock length along said rolls into said unit and beyond said switch means, for actuating said clutch to rotate said driven shaft and reciprocate said ejector for delivering a succeeding stock length onto said rolls, and means responsive to said rotation of said driven shaft for releasing said clutch upon completion of a single revolution of said driven shaft.

8. Apparatus for automatically feeding successive lengths of elongated stock into a fabricating unit, comprising: an aligned series of driven feed rolls for feeding and guiding said stock lengths successively and longitudinally into said fabricating unit, a magazine for containing a supply of said stock lengths, an ejector reciprocable to transfer said stock lengths successively from said magazine onto said rolls, a driven shaft eccentrically linked to said ejector, for reciprocating same, once for each revolution of said shaft, a clutch actuatable to couple said driven shaft to a driving shaft for a single revolution thereof for each clutch actuation, a first switch, including a weighted, vertically displaceable switch arm adapted to ride upon each stock length during its propulsion along said rolls, and to drop down under gravity to actuate said switch upon transit of said stock length beyond said switch arm, a first solenoid responsive to said switch actuation, for actuating said clutch, to rotate said driven shaft one revolution thereof for delivering a succeeding stock length onto said rolls, a cam on said driven shaft, a second switch having a switch arm normally engaging a recess in said cam, and a second solenoid responsive to said switch upon displacement of said switch arm from said cam recess upon rotation of said cam, for elevating said first switch arm above the level of said succeeding stock length, said second switch and solenoid releasing upon re-entry of said second switch arm in said cam recess upon completion of said revolution of said driven shaft, to permit said first switch arm to fall under gravity against said succeeding stock length being propelled along said rolls.

9. Apparatus for automatically delivering and feeding successive lengths of elongated stock, longitudinally into a fabricating unit, comprising a series of aligned pairs of feed rolls, means mounting the rolls of each pair with their axes parallel, and in axially displaced relation with respect to each other, the respective rolls of each pair having oppositely disposed, arcuate work surfaces, means for adjusting the spacing between the roll axes in accordance with the sectional dimension of the stock being fed, means for continuously driving the rolls of each pair in the same direction, and means for adjustably positioning said roll pairs with their axes oblique to the direction of alignment, for feeding succesive lengths of said stock longitudinally into said fabricating unit, upon delivery of said stock length between the rolls of each pair, a magazine for retaining a supply of said stock lengths in substantially parallel relation, a reciprocable ejector mechanism for transferring successive lengths of said stock from said magazine onto said feed roll pairs, said ejector mechanism including a pivotally mounted finger member having a finger portion adapted to receive and thereafter release successive lengths of said stock, and having a second finger portion operable between a pair of spaced stops, one said stop engaging said arm on the back stroke of said ejector mechanism for elevating said finger portion to receive a length of said stock, under gravity from said magazine, and the second said stop engaging said arm on the forward stroke of said ejector mechanism for depressing said finger portion to deliver said stock lengths under gravity therefrom onto said feed roll pairs, means for reciprocably driving said ejector mechanism, and means responsive to propulsion of a stock length along said feed roll pairs past said ejector mechanism, for energizing said ejector driving means, to deliver a succeeding stock length onto said feed rolls, and means responsive to said delivery for deenergizing said driving means.

10. Apparatus for automatically delivering and feeding successive lengths of elongated stock longitudinally into a fabricating unit comprising: a series of feed rolls mounted in alignment on a roll table, means for adjusting said table in elevation and laterally, and means for driving said rolls for feeding successive lengths of said stock delivered thereon longitudinally into said fabrication unit, a magazine sloping downwardly toward said feed rolls for receiving a supply of said stock lengths in substantially parallel relation and feeding the same under gravity toward said feed rolls, a reciprocable ejector mechanism for transferring successive lengths of said stock from said magazine onto said feed rolls, said ejector mechanism comprising a grooved and slotted base member, an ejector member pivotally mounted in the slot thereof and having a finger portion adapted to receive and release successive lengths of said stock, and an arm operable between a pair of spaced stops, one said stop engaging said arm on the back stroke of said ejector mechanism for elevating said finger portion for reception between it and a shoulder of said base member, of a length of said stock delivered under gravity from said magazine, and said second stop engaging said arm on the forward stroke of said ejector mechanism, for depressing said finger portion for delivering said stock length under gravity therefrom onto said feed rolls, said ejector mechanism also including a bevelled member adjustable along a slot of said base member, for adjusting the depth of entry of said stock between said base member and finger portion in the elevated position of the latter, means for reciprocably driving said ejector mechanism, and means responsive to propulsion of said stock length along said feed rolls and past said ejector mechanism, for energizing said ejector driving means to deliver a succeeding stock length onto said feed rolls, and means responsive to said delivery for deenergizing said driving means.

11. Apparatus for automatically delivering and feeding sections of bar stock into a fabricating unit comprising: a series of driven rolls for feeding said bars longitudinally into said unit, a magazine table sloping downwardly toward said rolls for feeding said bars transversely toward said rolls by gravity, guide plates disposed above said table adjacent said rolls for feeding said bars in a single layer toward said rolls, said plates being adjustably mounted to vary the spacing between said plates and table in accordance with the sectional dimensions of said bars, said plates forming an abutment at the rear of said table for retaining a stacked surplus of said bars, an ejector reciprocable to transfer said bars successively from said magazine onto said rolls, a driven shaft eccentrically linked to said ejector for reciprocating the same, a shuffle bar eccentrically linked to said shaft and having a lower slotted arm pin-connected to a fixed support and an upper arm adapted during rotation of said shaft, to engage and displace surplus bars stacked against said guide plates for feeding said bars uniformly into the space between said table and guide plates, a first switch means positioned adjacent said fabricating unit and responsive to transit of a stock length along said rolls into said fabricating unit and beyond said switch means, for actuating said clutch to rotate said driven shaft and reciprocate said ejector, for delivering a succeeding stock length onto said rolls, and means responsive to said rotation of said driven shaft for releasing said clutch upon completion of a single revolution of said driven shaft.

12. In apparatus of the class described, a pair of fabricating units for operating on successive lengths of elongated stock; a feeder device for each fabricating unit for automatically feeding said stock into said fabricating unit; and a transfer mechanism for receiving the stock which has passed through one of such units and transferring same to the feeder device of the remaining fabricating unit; each such feeder device comprising, a series of driven rolls and means for continuously driving the same for feeding successive lengths of said stock longitudinally into its associated fabricating unit, a feeder magazine for holding a supply of said stock lengths in substantially parallel relation, an ejector mechanism for discharging successive lengths of said stock from said magazine onto said feed rolls, means responsive to passage of a section of said stock beyond a preselected station with respect to said feed rolls for actuating said ejector mechanism to discharge a succeeding section of stock onto said feed rolls; said transfer mechanism comprising a runout trough for receiving stock lengths acted upon by the first of said fabricating units, transfer means for transferring said stock lengths onto the feeder magazine of the next feeder device, and means for actuating said transfer means in response to a stock length assuming a preselected position in said trough.

13. In apparatus of the class described, the combination comprising: a pair of fabricating units for operating upon successive lengths of elongated stock; a feeder device for each fabricating unit for automatically feeding said stock lengths successively into said fabricating unit; a transfer mechanism for receiving said stock lengths successively after having passed through one of such units and transferring same to the feeder device of the remaining fabricating unit; each such feeder device comprising, a series of feed rolls and means for continuously driving the same for feeding successive sections of said stock longitudinally into its associated fabricating unit, a feeder magazine for holding a supply of said stock lengths, an ejector mechanism for successively releasing lengths of said stock from said magazine onto said feed rolls, means responsive to longitudinal movement of a stock length along said feed rolls to a preselected point relative to said rolls for actuating said ejector mechanism to release a succeeding stock length, said transfer mechanism comprising, a trough for receiving successively the stock lengths acted upon by the first of said fabricating units, elevating means for elevating said stock from said trough and discharging the same onto the feeder magazine of the next feeder device, and means for actuating said elevating means in response to delivery of a stock length onto said trough.

14. In combination: a pair of fabricating units for operating upon elongated sections of bar stock; a feeder for each fabricating unit for automatically feeding successive lengths of said stock into said fabricating units respectively, each feeder including a plurality of aligned feed rolls for feeding and guiding said stock lengths successively and longitudinally into a fabricating unit, a gravity feed magazine for feeding a supply of stock lengths to said feed rolls, a release mechanism actuatable for releasing said stock lengths successively from said magazine onto said rolls, an actuator for said release mechanism including means responsive to the transit of a section of stock beyond a preselected point on said rolls for actuating said release mechanism whereby a succeeding stock length is delivered onto said feed rolls, delivery means for receiving stock lengths which have been acted upon by one of the fabricating units and including a trough into which stock lengths are successively delivered, a transfer mechanism for transferring said stock lengths delivered from said first fabricating unit to the feeder for the next fabricating unit, said mechanism including elevating means actuatable to elevate said stock lengths from said trough onto the magazine of the feeder for the second fabricating unit, and means including a switch element positioned at one extremity of said trough and actuatable by the pressure of a stock length thereagainst, for actuating said elevating mechanism.

EUGENE LOMBARD.

No references cited.